(12) United States Patent
Furukawa et al.

(10) Patent No.: US 9,395,578 B2
(45) Date of Patent: Jul. 19, 2016

(54) ILLUMINATION UNIT, DISPLAY, AND ELECTRONIC APPARATUS

(75) Inventors: Norimasa Furukawa, Tokyo (JP); Kentaro Okuyama, Kanagawa (JP)

(73) Assignee: Sony Corporation (JP)

( * ) Notice: Subject to any disclaimer, the term of this patent is extended or adjusted under 35 U.S.C. 154(b) by 86 days.

(21) Appl. No.: 14/347,719

(22) PCT Filed: Sep. 4, 2012

(86) PCT No.: PCT/JP2012/072449
§ 371 (c)(1),
(2), (4) Date: Mar. 27, 2014

(87) PCT Pub. No.: WO2013/051360
PCT Pub. Date: Apr. 11, 2013

(65) Prior Publication Data
US 2014/0240642 A1    Aug. 28, 2014

(30) Foreign Application Priority Data

Oct. 5, 2011    (JP) ................................. 2011-220682

(51) Int. Cl.
| | |
|---|---|
| *G02F 1/133* | (2006.01) |
| *G02F 1/1335* | (2006.01) |
| *H05B 33/08* | (2006.01) |
| *G09G 3/36* | (2006.01) |
| *G02F 1/1334* | (2006.01) |

(52) U.S. Cl.
CPC .... *G02F 1/133615* (2013.01); *G02F 1/133606* (2013.01); *G09G 3/36* (2013.01); *H05B 33/0857* (2013.01); *G02F 1/1334* (2013.01); *G02F 2203/62* (2013.01); *G09G 2300/0456* (2013.01); *G09G 2310/0235* (2013.01); *G09G 2360/144* (2013.01)

(58) Field of Classification Search
CPC ................... G02F 1/133615; G02F 1/133606; G09G 3/36; H05B 33/0857
See application file for complete search history.

(56) References Cited

U.S. PATENT DOCUMENTS

| | | | |
|---|---|---|---|
| 8,237,888 B2 | 8/2012 | Okuyama et al. | |
| 2006/0203154 A1 | 9/2006 | Uchida | |
| 2010/0085510 A1* | 4/2010 | Okuyama et al. | 349/65 |
| 2010/0177025 A1* | 7/2010 | Nagata et al. | 345/76 |
| 2012/0162268 A1* | 6/2012 | Fleck et al. | 345/690 |

FOREIGN PATENT DOCUMENTS

| | | |
|---|---|---|
| JP | 2010-092682 A | 4/2010 |
| WO | 2011-052330 A1 | 5/2011 |

* cited by examiner

*Primary Examiner* — James Dudek
(74) *Attorney, Agent, or Firm* — Lerner, David, Littenberg, Krumholz & Mentlik, LLP

(57) ABSTRACT

Provided is an illumination unit capable of utilizing back light. Also provided are a display and an electronic apparatus each including this illumination unit. A display includes a display panel, and an illumination unit configured to illuminate the display panel. The illumination unit includes a light-guiding plate, a diffusion modulation device, and a reflection modulation device in this order, from the display panel side. The light-guiding plate has a light source on a side face thereof. The diffusion modulation device is capable of performing modulation between a first state of diffusing light from the light source, and a second state of allowing incident light from a back face side to pass to a front face side. The reflection modulation device is capable of performing modulation between a third state of reflecting transmitted diffused light of the diffusion modulation device to a front face side, and a fourth state of allowing incident light from a back face side to the front face side.

20 Claims, 21 Drawing Sheets

FIG. 4
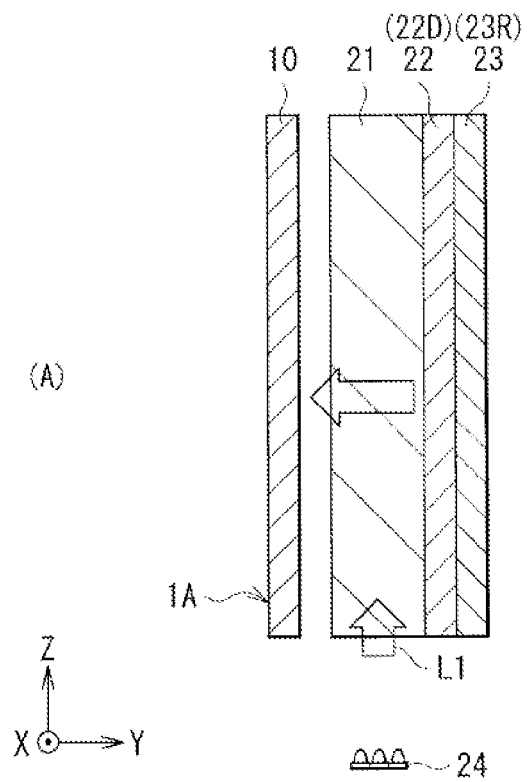
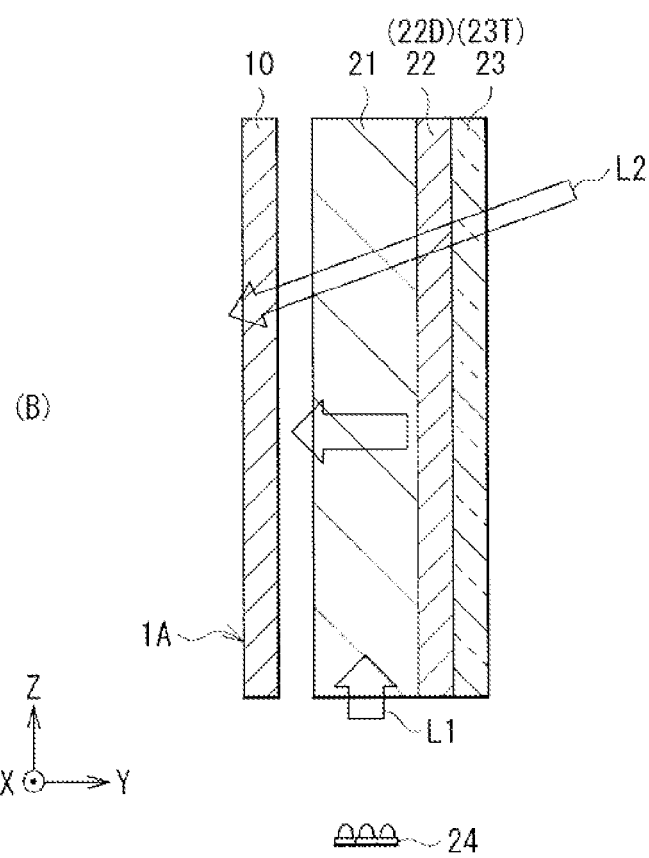

FIG. 5
(A)
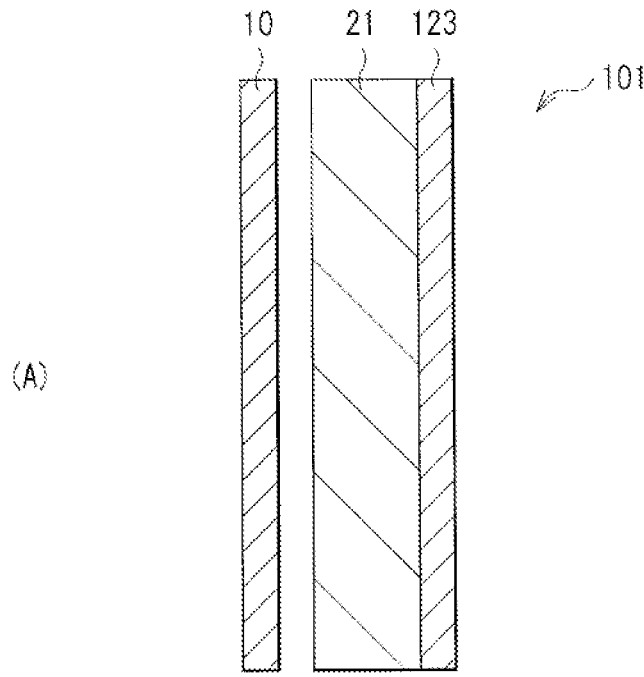
(B)
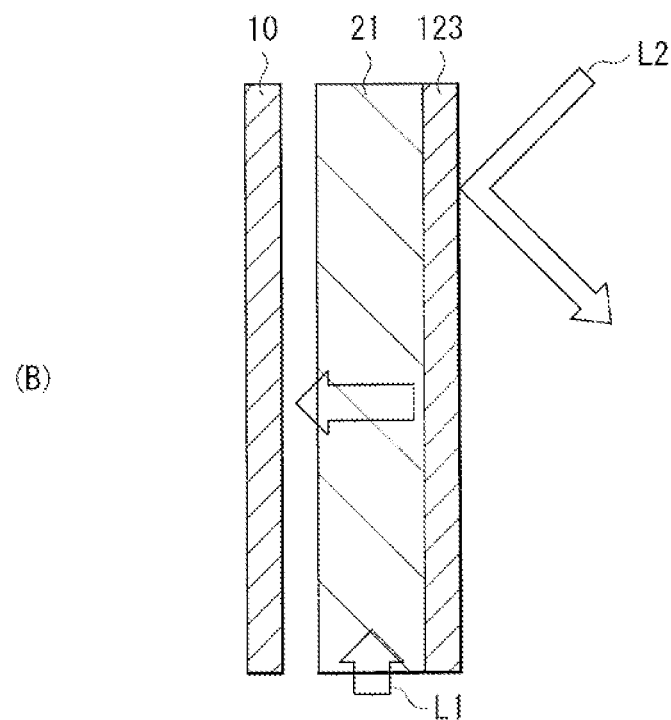

FIG. 6
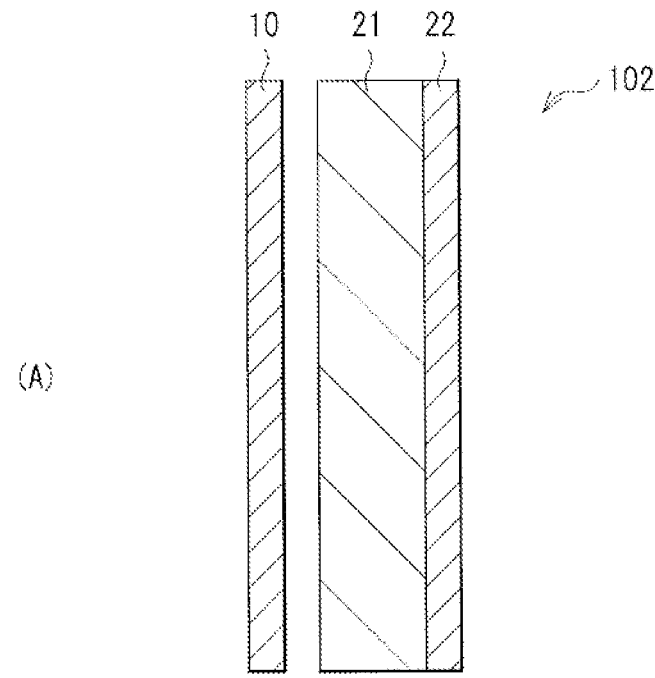
(A)
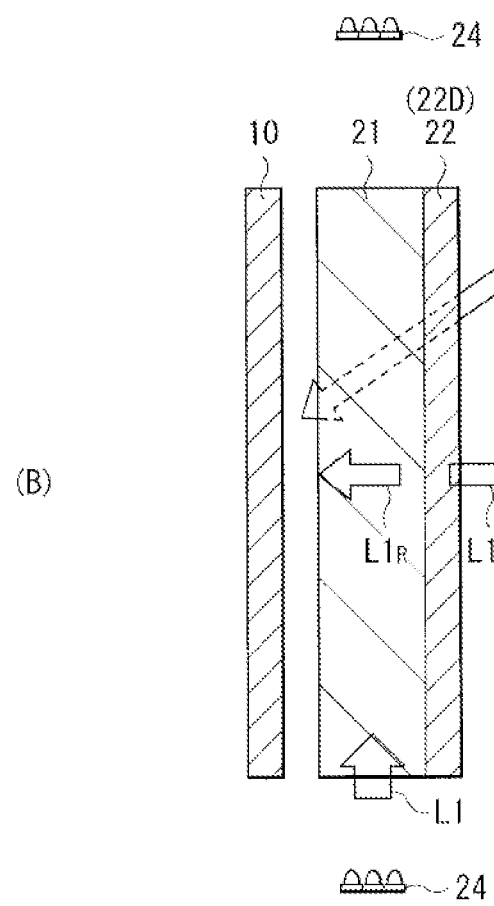
(B)

FIG. 19
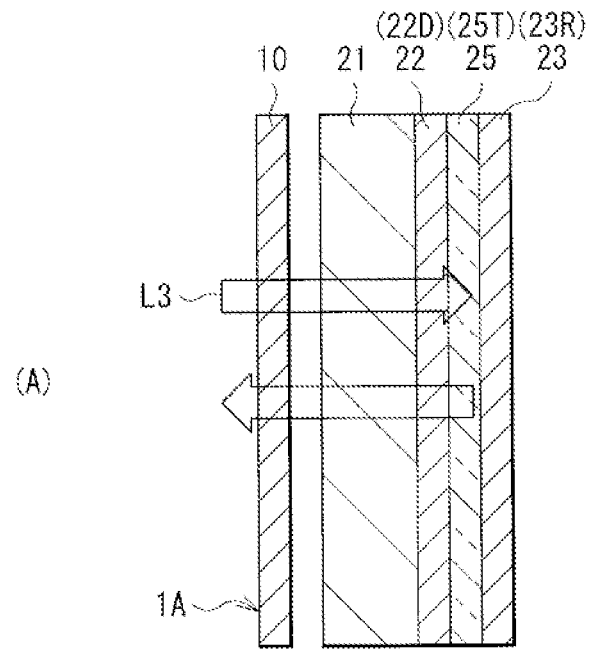
(A)
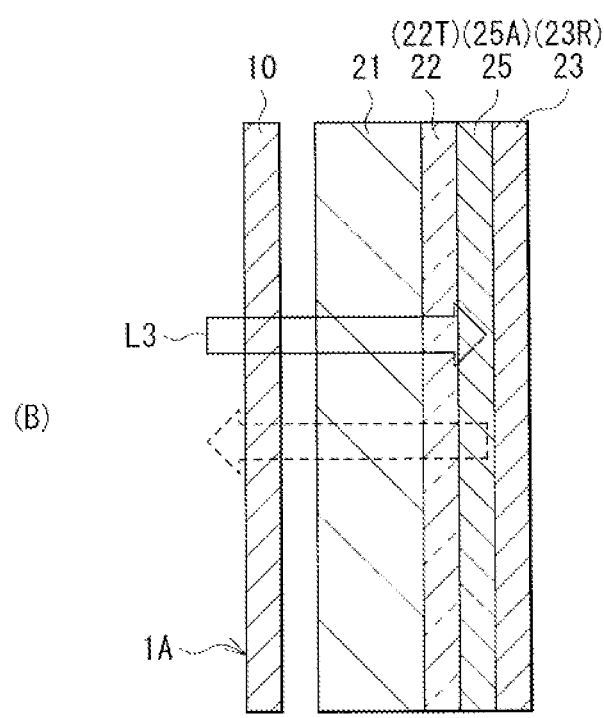
(B)

ILLUMINATION UNIT, DISPLAY, AND ELECTRONIC APPARATUS

CROSS-REFERENCE TO RELATED APPLICATION

The present application is a national phase entry under 35 U.S.C. §371 of International Application No. PCT/JP2012/072449 filed Sep. 4, 2012, published on Apr. 11, 2013 as WO 2013/051360 A1, which claims priority from Japanese Patent Application No. JP 2011-220682 filed in the Japanese Patent Office on Oct. 5, 2011.

TECHNICAL FIELD

The present technology relates to an illumination unit suitable for a backlight that irradiates a display panel, and also relates to a display and an electronic apparatus each provided with this illumination unit.

BACKGROUND ART

An optical-modulation-type display panel is used for many electronic apparatuses such as electronic paper, besides thin information terminal apparatuses such as mobiles. This optical-modulation-type display panel displays an image, by blocking incident light or allowing the incident light to pass therethrough, for each pixel. A liquid-crystal display panel may be an example of the optical-modulation-type display panel. In recent years, an optical-modulation-type display panel of a non-liquid-crystal type has also been widely in practical use.

On a back face side of such an optical-modulation-type display panel, an illumination unit (a backlight) is provided, and light outputted from this backlight is incident on the display panel to display an image. An edge light system suitable for a reduction in thickness is often used for the backlight. In the edge light system, a light source is disposed on a side face of a light-guiding plate, and the backlight serves as a surface emitter, when light taken in by the light-guiding plate from the light source travels inside the light-guiding plate while being totally reflected.

As a way of extracting this light propagating inside the light-guiding plate, there has been proposed a method of providing a diffusion modulation device and a reflection device in this order on a back face side of the light-guiding plate (see, for example, Patent Literature 1). The diffusion modulation device is capable of electrically switching an action state for incident light between a diffusion state and a transmission state, and is, specifically, a polymer dispersed liquid crystal (PDLC). On the other hand, for the reflection device, for example, a device having high reflectance such as a white diffuse reflection sheet may be used. In the illumination unit having such a configuration, transmitted diffused light is outputted from the polymer dispersed liquid crystal in a diffusion state to a back face side. However, this transmitted diffused light is returned to a front face side at the diffuse reflection sheet and therefore, it is possible to utilize the light outputted from the light source (the light-guiding plate), as irradiation light to the display panel, efficiently.

CITATION LIST

Patent Literature

Patent Literature 1: Japanese Unexamined Patent Application Publication No. 2010-92682

SUMMARY OF THE INVENTION

However, in order to increase diversity of display further, it is desirable to be able to utilize light (back light) incident from the back face side of the backlight, including outside light.

Therefore, it is desirable to provide an illumination unit capable of utilizing back light, and a display as well as an electronic apparatus each provided with this illumination unit.

An illumination unit according to an embodiment of the present technology includes a light-guiding plate, a diffusion modulation device, and a reflection modulation device in this order. The light-guiding plate has a light source on a side face thereof. The diffusion modulation device is capable of performing modulation between a first state of diffusing light from the light source, and a second state of allowing incident light from a back face side to pass to a front face side. The reflection modulation device is capable of performing modulation between a third state of reflecting transmitted diffused light of the diffusion modulation device to a front face side, and a fourth state of allowing incident light from a back face side to the front face side. Light is outputted from the light-guiding plate side. A display according to an embodiment of the present technology includes the above-described illumination unit on a back face side of the display panel as a backlight. An electronic apparatus according to an embodiment of the present technology includes the above-described display.

In the display, the illumination unit, and the electronic apparatus according to the above-described embodiments of the present technology, the reflection modulation device is capable of allowing the incident light from the back face side to pass to the front face side. Therefore, the back light is allowed to pass to the front face side without being blocked by the reflection modulation device. Further, the light outputted from the light source is efficiently outputted to the display panel side, by switching an action state of the diffusion modulation device and the reflection modulation device, to a state in which the diffusion modulation device diffuses the light from the light source, and the reflection modulation device reflects the transmitted diffused light of the diffusion modulation device to the front face side.

According to the display, the illumination unit, and the electronic apparatus of the above-described embodiments of the present technology, the reflection modulation device is configured to be capable of allowing the incident light from the back face side to pass to the front face side. Therefore, the back light is allowed to be utilized as irradiation light to the display panel side. Accordingly, image display efficiently utilizing the incident light from the light source is possible, and display utilizing the back light is also possible.

BRIEF DESCRIPTION OF DRAWINGS

FIG. 4 is a diagram used to describe an outgoing beam from a backlight illustrated in FIG. 1.

FIG. 5 is a side cross-sectional diagram illustrating a configuration of a display according to a comparative example 1.

FIG. 6 is a side cross-sectional diagram illustrating a configuration of a display according to a comparative example 2.

FIG. 19 is a diagram used to describe a path of outside light incident on the display illustrated in FIG. 18.

MODES FOR CARRYING OUT THE INVENTION

Figure 1:
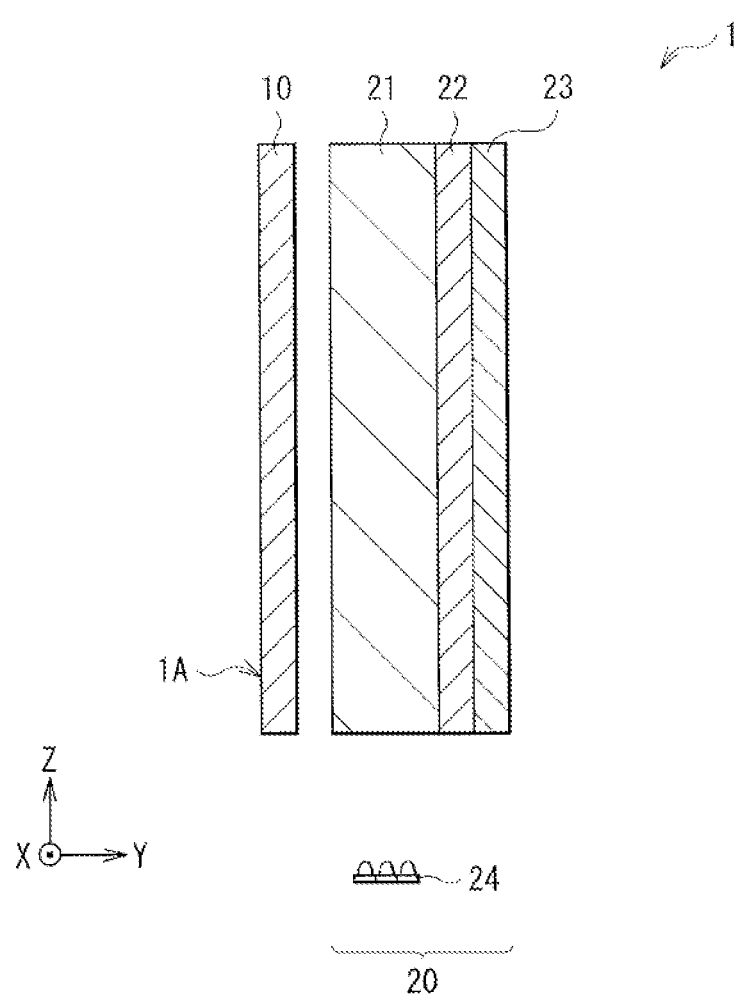
FIG. 1 is a side cross-sectional diagram illustrating a configuration of a display according to a first embodiment of the present disclosure.

Embodiments of the present technology will be described below in detail with reference to the drawings. It is to be noted that the description will be provided in the following order.
1. First embodiment
   An example in which a reflection modulation device performs specular reflection (a third state)
2. Modification 1
   An example in which field sequential color display is performed
3. Modification 2
   An example in which outside light correction is performed
4. Second embodiment
   An example in which a reflection modulation performs diffuse reflection (a third state)
5. Third embodiment
   An example in which an absorption modulation device is provided First Embodiment FIG. 1 illustrates a side cross-sectional configuration of a display (a display 1) according to a first embodiment of the present disclosure. The display 1 includes a display panel 10 of transmission type, and a backlight 20. The display 1 modulates light outputted from the backlight 20 based on an image signal, and displays the modulated light on an image display surface 1A of the display panel 10. The backlight 20 is disposed on a side (on a back face side of the display panel 10) opposite to the image display surface 1A of the display panel 10, and a plurality of optical sheets (not illustrated) are provided between the display panel 10 and the backlight 20. This optical sheet may be, for example, a lens film, a sheet intended to improve luminance through polarization conversion, or the like.

The display panel 10 may be, for example, a liquid-crystal display panel, and have a liquid crystal layer provided between a pair of transparent substrates. If the display panel 10 allows incident light from the backlight 20 to pass therethrough or blocks this incident light for each pixel, in other words, if the display panel 10 is an optical-modulation-type display panel, the display panel 10 may be a non-liquid-crystal-type display panel.

The backlight 20 includes a light-guiding plate 21, a diffusion modulation device 22, and a reflection modulation device 23 in this order, from the display panel 10 side. This backlight 20 is an edge-light-type surface emitter, and a light source 24 is provided on a side face of the light-guiding plate 21.

The light-guiding plate 21 is a plate that takes in light of the light source 24 from the side face, and causes this light to propagate inside due to total reflection. This light-guiding plate 21 has a shape corresponding to the display panel 10, and may be, for example, a rectangular plate. The shape of the light-guiding plate 21 may be any if the shape allows the light to propagate inside due to the total reflection. For example, a shape having a thickness changing stepwise (for example, a wedge shape) may be adopted. A predetermined pattern is provided on at least one of a front face and a back face of the light-guiding plate 21, and the light of the light source 24 is diffused and made uniform by this predetermined pattern. When the luminance is to be made uniform by modulating a voltage to be applied to the backlight 20, this predetermined pattern may be omitted. The light-guiding plate 21 as described above may be mainly configured of, for example, a transparent thermoplastic resin such as polycarbonate (PC) resin, acrylic resin, and polymethyl methacrylate (PMMA).

The diffusion modulation device 22 is capable of modulating an action for incident light between a diffusion state (a first state) and a transmission state (a second state), for example, electrically, and may be, specifically, a PDLC, a PNLC (Polymer Network Liquid Crystal), or the like. This diffusion modulation device 22 is also capable of performing an adjustment not only between the diffusion state and the transmission state, but to an intermediate state between the diffusion state and the transmission state, depending on the magnitude of an applied voltage. The diffusion modulation device 22 adheres to the back face of the light-guiding plate 21 without an air layer therebetween. The diffusion modulation device 22 includes a transparent substrate 221, a lower electrode 222, an alignment film 223, an optical modulation layer 224, an alignment film 225, an upper electrode 226, and a transparent substrate 227 in this order from the reflection modulation device 23 side, as illustrated in, for example, Part (A) of FIG. 2.

The transparent substrates 221 and 227 support the optical modulation layer 224 and may be configured of, for example, a glass plate or a plastic film. The lower electrode 222 is provided on a surface of the transparent substrate 221, the surface facing the transparent substrate 227. This lower electrode 222 may be, for example, stripe-shaped, and provided as each of a plurality of lower electrodes 222 extending in the same direction. The upper electrode 226 is provided on a surface of the transparent substrate 227, the surface facing the transparent substrate 221. The upper electrode 226 may be, for example, stripe-shaped as well, and provided as each of a plurality of upper electrodes 226 extending in the same direction intersecting (orthogonal to) the extending direction of the lower electrode 222 (Part (B) of FIG. 2). In the diffusion modulation device 22 having the lower electrodes 222 and the upper electrodes 226 having such shapes, simple matrix driving is possible. However, for example, active matrix driving may be performed by forming one of the lower electrode 222 and the upper electrode 226 to be solid-film-shaped, and the other to be minute-square-shaped. In this diffusion modulation device 22, it is possible to form both the lower electrode 222 and the upper electrode 226 to be solid-film-shaped, and in this case, a screen is modulated uniformly. The upper electrode 226 may be made of a transparent conductive material, for example, indium tin oxide (ITO). The lower electrode 222 may be configured of the same material as that of the upper electrode 226, or may be configured of an opaque conductive material.

The alignment films 223 and 225 control orientation of the optical modulation layer 224. These alignment films 223 and 225 each may be, for example, a vertical alignment film, and made of a silane coupling material, polyvinyl alcohol (PVA), a polyimide-based material, a surfactant, or the like.

The optical modulation layer 224 is capable of performing modulation electrically between a cloudy state (a diffusion state) and a transparent state (a transmission state), and may include, for example, a bulk 224A and fine particles 224B dispersed in the bulk 224A. This optical modulation layer 224 is also capable of being set in a state between the cloudy state and the transparent state, depending on the magnitude of a voltage applied to the lower electrode 222 and the upper electrode 226.

The bulk 224A may be configured of, for example, a polymer. The bulk 224A has a stripe-shaped structure or porous structure in which no response is given to an electric field, or a bar-like structure in which a response speed is lower than that of the fine particles 224B. The fine particles 224B have the response speed higher than that of the bulk 224A, and may be configured of, for example, liquid crystal molecules. In this optical modulation layer 224, for example, incident light may be diffused by the fine particles 224B facing in random directions when no voltage is applied (the diffusion state), and the incident light may be allowed to pass by the fine particles 224B being oriented in an electric field direction when a voltage is applied (the transmission state).

The reflection modulation device 23 of the present embodiment is capable of modulating an action for incident light, between a reflection state (a third state) and a transmission state (a fourth state). As will be described later in detail, this allows the backlight 20 to irradiate the display panel 10 side efficiently with the light outputted from the light source 24, and also to utilize light (back light) incident from a back face side of the reflection modulation device 23.

The reflection modulation device 23 may be, for example, capable of electrically switching between the reflection state (a reflection state 23R in Part (A) of FIG. 4 to be described later) and the transmission state (a transmission state 23T in Part (B) of FIG. 4 to be described later). The reflection modulation device 23 may be also adjustable to an intermediate state between the reflection state and the transmission state, depending on the magnitude of the applied voltage. In the reflection state 23R, light incident from a front face side (the diffusion modulation device 22 side) is guided to the light-guiding plate 21 side (the display panel 10 side) using specular reflection. In the transmission state 23T, light incident from a back face side (a side opposite to the diffusion modulation device 22) is allowed to pass to the light-guiding plate 21 side. A member on the back face side of the reflection modulation device 23 such as a housing may be preferably configured to allow light to be incident on the back face of the reflection modulation device 23. In addition, a light-guiding body may be separately provided on the back face of the reflection modulation device 23.

This reflection modulation device 23 may be capable of switching between the reflection state 23R and the transmission state 23T, using, for example, an electrochromic method (for example, see Japanese Unexamined Patent Application Publication Nos. 2005-274630, 2006-267670, and 2008-152070) or using a cholesteric liquid crystal (for example, see FUJIFILM RESEARCH & DEVELOPMENT No. 50-2005, p 60-63, NATURE VOL 392, 2 Apr. 1998, p 476-479, SEN'I GAKKAISHI (report) Vol. 60, No. 6 (2004), p 179-182). Specific examples of the electrochromic method may include a method using a magnesium-nickel (Mg—Ni) alloy, a magnesium-titanium (Mg—Ti) alloy, or the like. The reflection modulation device 23 is not limited to these in terms of material, and may be capable of switching between the reflection state and the transmission state by a method other than the voltage application, for example, magnetically. The reflection modulation device 23 is provided to adhere to a back face of the diffusion modulation device 22 without an air layer therebetween, by an adhesive or the like. For this adhesive or the like intended to achieve adherence between the reflection modulation device 23 and the diffusion modulation device 22, preferably, an adhesive providing a small difference between a refractive index of the reflection modulation device 23 and that of the diffusion modulation device 22 may be used, and more preferably, there may be almost no difference between the refractive indexes.

The light source 24 is configured as a linear light source having light distribution in substantially one line, and provided on one side face of the light-guiding plate 21. This light source 24 may be, for example, made of a light emitting diode (LED), a hot cathode fluorescent lamp (HCFL), a cold cathode fluorescent lamp (CCFL), or the like. Besides these, for example, an organic EL (Electroluminescence) device, a quantum dot light emitter, or the like may also be used to configure the light source 24. When the light source 24 is configured using the LED, for example, a red LED emitting red light (wavelength: 620 nm to 750 nm), a green LED emitting green light (wavelength: 495 nm to 570 nm), and a blue LED emitting blue light (wavelength: 450 nm to 495 nm) may be arranged in one line, or a white LED emitting white light may be used. The light source 24 may be provided on each of a plurality of side faces. Arrangement of a drive circuit group and the like around the display panel 10 is adjusted as appropriate by the arrangement of the light source 24.

Figure 3:
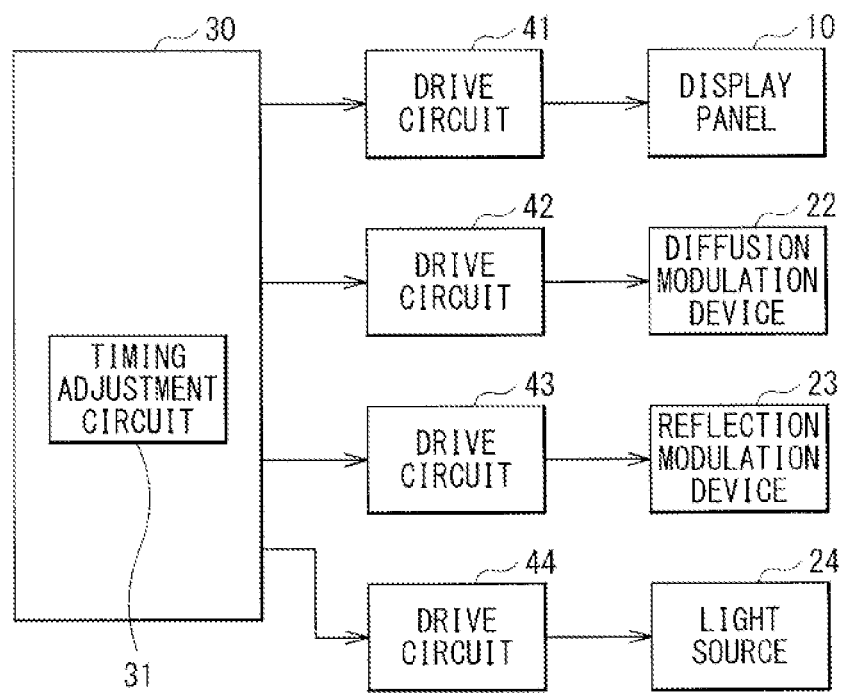
FIG. 3 is a block diagram illustrating a circuit configuration of the display illustrated in FIG. 1.

FIG. 3 illustrates an outline of a circuit configuration example of a control system and a drive system of the display 1 as described above. The display 1 includes drive circuits 41, 42, 43, and 44 (a drive section) which drive the display panel 10, the diffusion modulation device 22, the reflection modulation device 23, and the light source 24, respectively. The display 1 further includes a control section 30 which performs signal processing for an input image signal and controls the drive circuits 41, 42, 43, and 44, and the like. The control section 30 is provided with a timing adjustment circuit 31, and signals are transmitted to the drive circuits 41, 42, 43, and 44 from this timing adjustment circuit 31, to determine a display state of the display panel 10, an action state for the light incident on each of the diffusion modulation device 22 and the reflection modulation device 23, and an emission state of the light source 24.

In this display 1 (FIG. 1), the light outputted from the backlight 20 is incident on the display panel 10, and an image is displayed on the image display surface 1A, based on a pixel selected in response to the input image signal. In the backlight 20, as illustrated in Part (A) of FIG. 4, when the diffusion modulation device 22 is in a diffusion state 22D, and the reflection modulation device 23 is in the reflection state 23R, the light (light L1) from the light source 24 after propagating in the light-guiding plate 21 is incident on the diffusion modulation device 22, and diffused in the diffusion modulation device 22. Of the light diffused in the diffusion modulation device 22, transmitted diffused light (not illustrated) after passing through the diffusion modulation device 22 is reflected by the reflection modulation device 23, and then outputted to the display panel 10 side, together with reflected diffused light outputted to the front face side by the diffusion modulation device 22. Here, the reflection modulation device 23 is capable of switching also to the transmission state 23T for the incident light. Therefore, in addition to the light L1 from the light source 24, light (back light L2) incident from the back face side of the backlight 20 (the reflection modulation device 23) is also allowed to be utilized as irradiation light to the display panel 10 side, as illustrated in Part (B) of FIG. 4. This will be described below using comparative examples (comparative examples 1 to 3).

Part (A) of FIG. 5 illustrates a configuration of a display (a display 101) according to the comparative example 1. A backlight of the display 101 is configured using the light-guiding plate 21 and a reflection device 123 adhering to the back face of the light-guiding plate 21. The reflection device 123 is a white (opaque) diffuse reflection sheet. This reflection device 123 guides light, which is extracted to the outside by, for example, dot printing or the like after propagating through the light-guiding plate 21, to the front face side at a high reflectance (for example, 90% or more). In other words, as illustrated in Part (B) of FIG. 5, in the display 101, the light L1 outputted from the light source 24 is allowed to be utilized efficiently as the irradiation light to the display panel 10. However, the reflection device 123 is in a reflection state constantly and therefore, the back light L2 is blocked by the reflection device 123 to be prevented from passing therethrough to the display panel 10 side.

Figure 7:
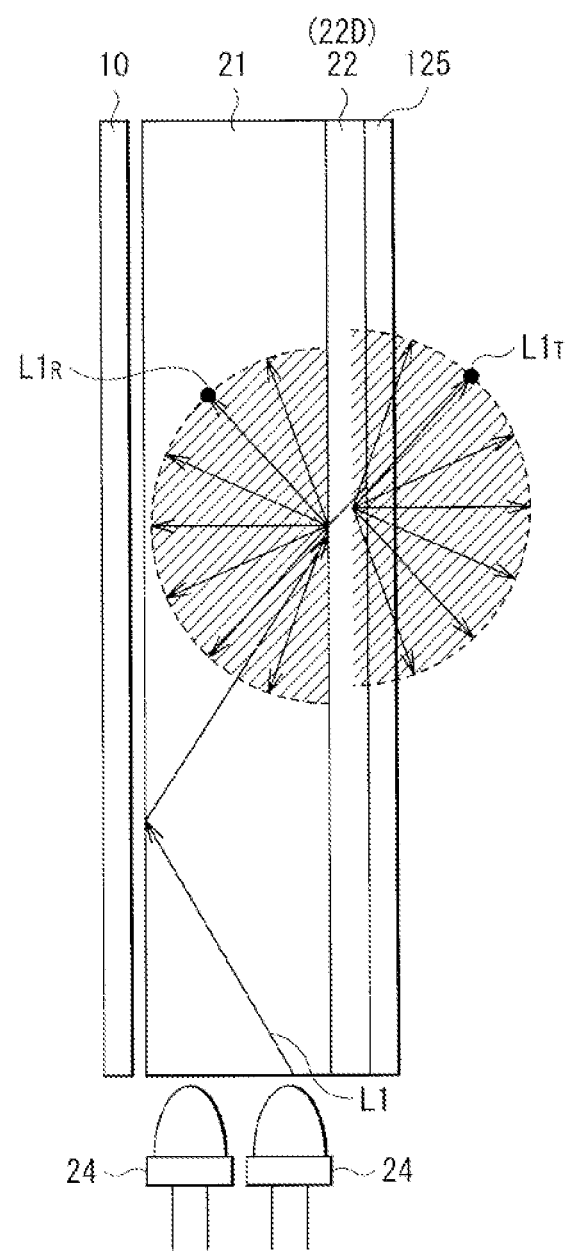
FIG. 7 is a diagram schematically illustrating a path of light outputted from a light source illustrated in FIG. 6.

A display (a display 102) according to the comparative example 2 is configured by arranging the diffusion modulation device 22 in place of the reflection device 123 in the above-described display 101 (Part (A) of FIG. 6). This diffusion modulation device 22 is capable of switching between the diffusion state 22D and the transparent state 22T in a manner similar to that of the diffusion modulation device 22 of the display 1, and is also allowed to utilize the back light L2 (Part (B) of FIG. 6). However, utilization efficiency of the light L1 decreases as compared with the display 101. Using FIG. 7, additional description will be provided for the diffusion of the diffusion modulation device 22 illustrated in FIG. 6. FIG. 7 is a diagram in which a transparent substrate 125 is provided on a back face of the diffusion modulation device 22, and which schematically illustrates directions of diffused light with arrows. The diffusion modulation device 22 in the diffusion state 22D guides about a half (reflected diffused light $L1_R$) of the light L1 to the front face side, and outputs the remaining half (transmitted diffused light $L1_T$) to the back face side. In other words, in the display 102, the transmitted diffused light $L1_T$ is not allowed to return to the light-guiding plate 21 side, leading to a decrease in light quantity. It is to be noted that, actual diffused light has directional dependence instead of perfect diffusion, but in FIG. 7, a total quantity of the reflected diffused light $L1_R$ and a total quantity of the transmitted diffused light $L1_T$ are illustrated to be substantially equal.

Figure 8:
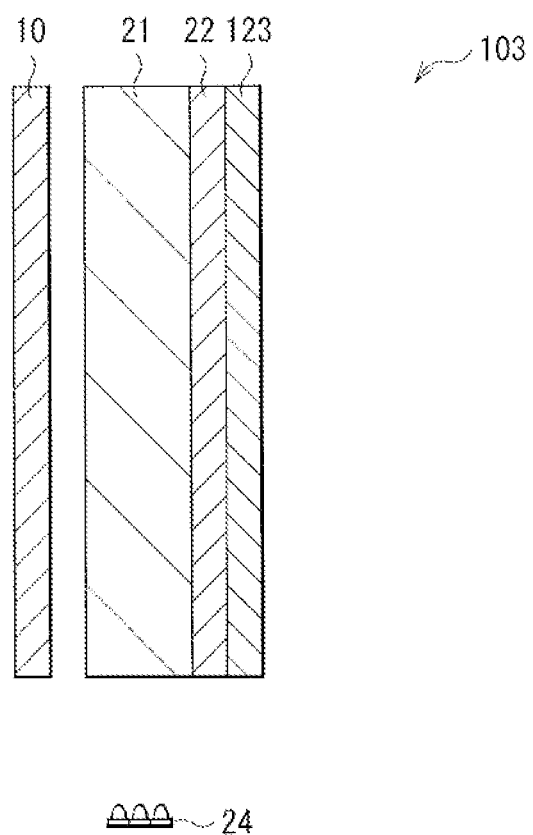
FIG. 8 is a side cross-sectional diagram illustrating a configuration of a display according to a comparative example 3.
Figure 9:
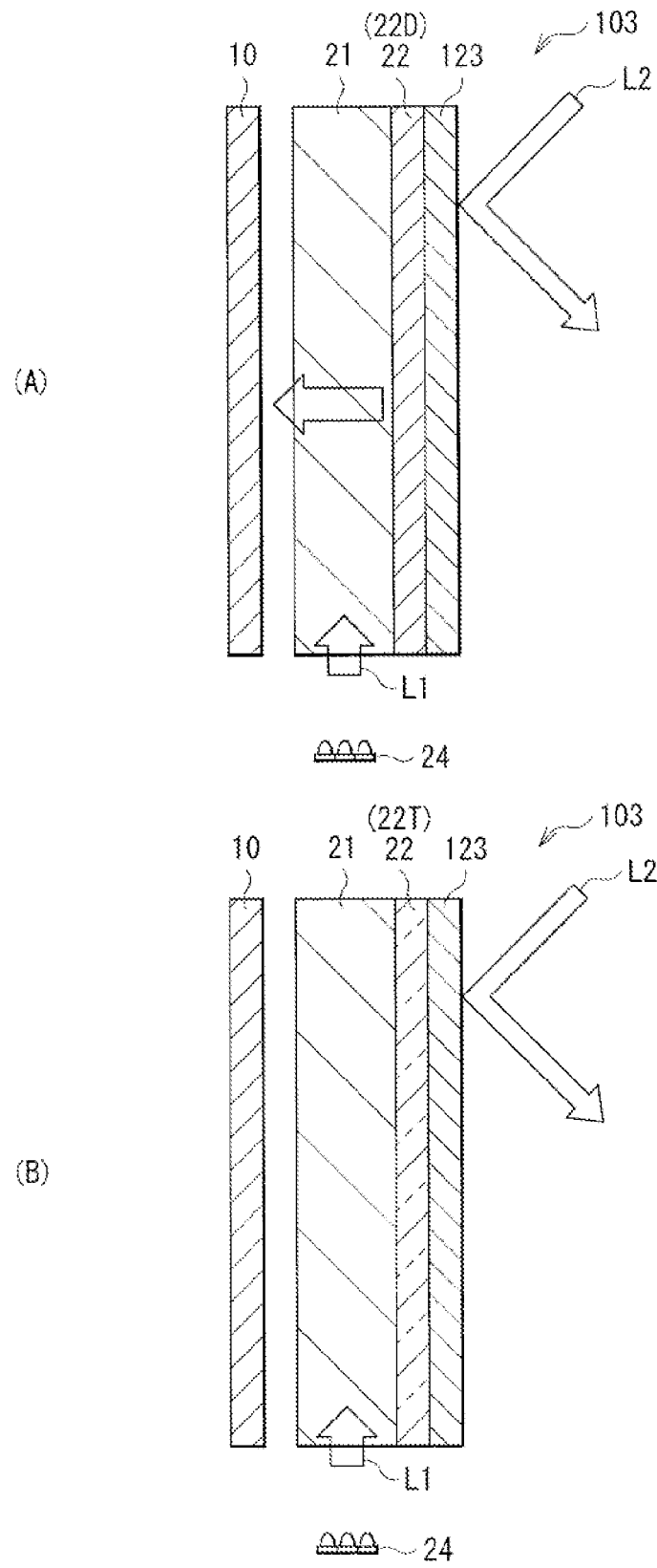
FIG. 9 is a diagram used to describe an outgoing beam from a backlight illustrated in FIG. 8.

A display (a display 103) according to the comparative example 3 is a display configured by providing the reflection device 123 of the display 101, on the back face side of the diffusion modulation device 22 of the display 102 (FIG. 8). In this display 103, the transmitted diffused light is allowed by the reflection device 123 to return to the front face side after passing through the diffusion modulation device 22 and therefore, the utilization efficiency of the light L1 improves. However, the back light L2 is blocked by the reflection device 123 to be prevented from passing therethrough to the display panel 10 side, when the diffusion modulation device 22 is in either of the diffusion state 22D (Part (A) of FIG. 9) and the transmission state 22T (Part (B) of FIG. 9). Further, in the transmission state 22T, the light L1 arrives at the diffusion modulation device 22 after propagating in the light-guiding plate 21, but is totally reflected at an interface (an air layer) with the reflection device 123, and prevented from being incident on the reflection device 123. In other words, the total reflection of the light L1 is repeated in the inside of the light-guiding plate 21 and therefore, the light L1 is prevented from being extracted to the display panel 10 side, which leads to a reduction in the light quantity of the irradiation light.

In contrast, in the display 1 of the present embodiment, the reflection modulation device 23 is allowed to be in the transmission state 23T and therefore, it is possible to utilize the back light L2 as the irradiation light to the display panel 10 side. In addition, it is also possible to guide the light L1 from the light source 24 to the display panel 10 side efficiently, by switching to the reflection state 23R.

Figure 10:
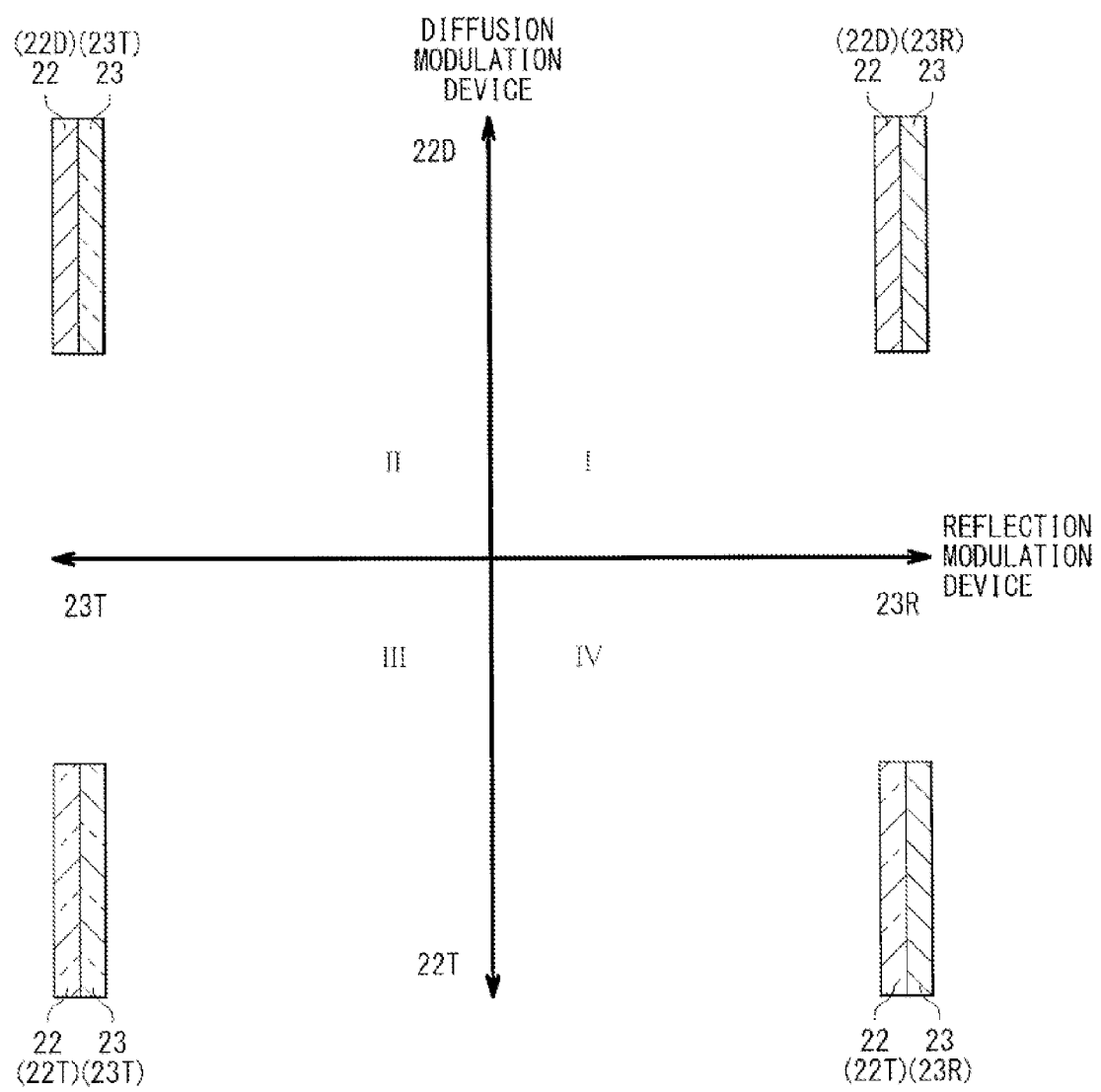
FIG. 10 is a diagram used to describe a display method of the display illustrated in FIG. 1.

FIG. 10 illustrates a possible state of the backlight 20, using a vertical axis as the state of the diffusion modulation device 22, and a horizontal axis as the state of the reflection modulation device 23. In a state of a first quadrant I (the diffusion modulation device: 22D, and the reflection modulation device: 23R), the transmitted diffused light of the diffusion modulation device 22 is guided by the reflection modulation device 23 to the front face side. Therefore, it is possible to irradiate the display panel 10 side, by utilizing the light L1 from the light source 24 efficiently. In a second quadrant II (the diffusion modulation device: 22D, and the reflection modulation device: 23T), the back light L2 is allowed to pass through the reflection modulation device 23, and then incident on the display panel 10. In other words, this is a state in which the back light L2 is allowed to be utilized together with the light L1 from the light source 24, as the irradiation light to the display panel 10. For example, outside light may be utilized as the back light L2. Alternatively, a light source different from the light source 24 may be provided on the back face side, and light from this light source may be utilized by being combined with the light L1 from the light source 24. A third quadrant III (the diffusion modulation device: 22T, and the reflection modulation device: 23T) is a state in which the back face side of the backlight 20 is transparent through the display panel 10 when viewed from the image display surface 1A side, and a complete transparent state is achievable by using this state. In a fourth quadrant IV (the diffusion modulation device: 22T, and the reflection modulation device: 23R), the outside light incident from the display panel 10 side is allowed to irradiate the display panel 10 by being reflected by the reflection modulation device 23R. In other words, in the state of the fourth quadrant IV, it is possible to use the display 1 as a reflection display. In addition to these first to fourth quadrants, an intermediate state between these states may also be set by adjusting timing of driving the drive circuits 41, 42, 43, and 44, the magnitude of the applied voltage, or the like.

Figure 11:
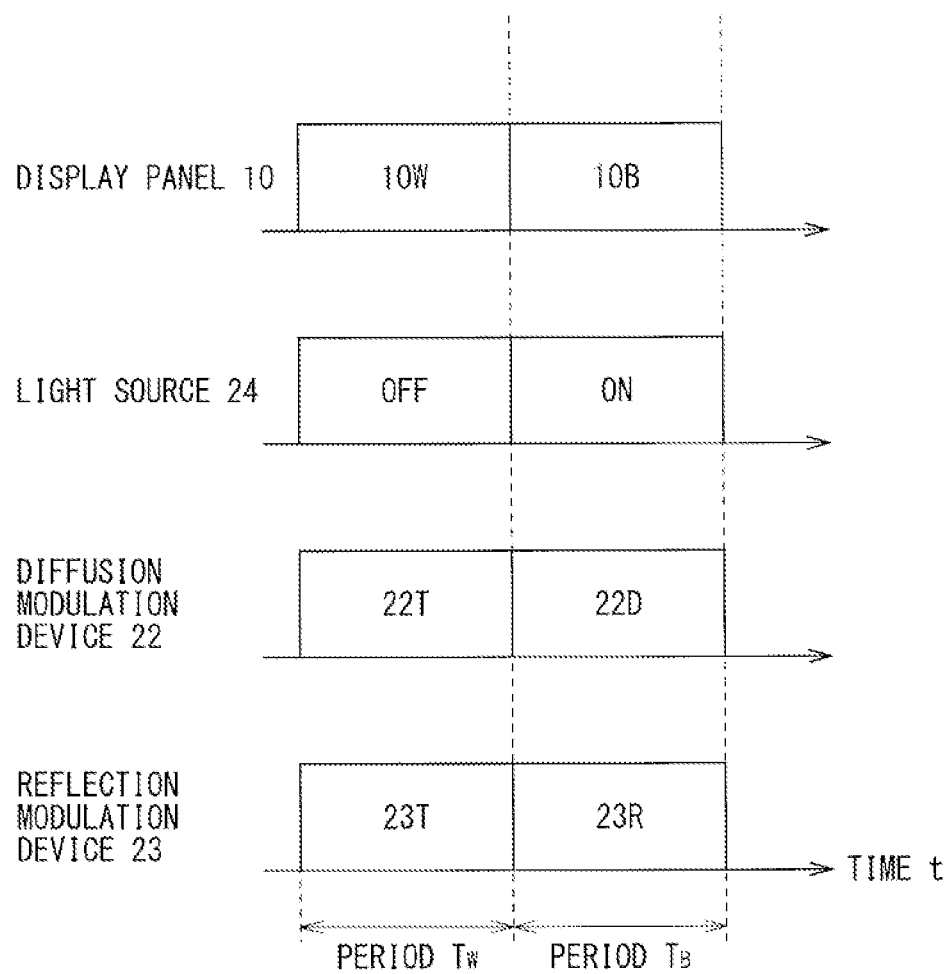
FIG. 11 is a diagram used to describe an example of the driving method of the display illustrated in FIG. 1.

In this way, in the present embodiment, it is possible to change a light utilization form and a modulation state of the backlight 20 by using the drive circuits 41, 42, 43, and 44 and therefore, it is also possible to display an image in a new method by combining their states. For example, as illustrated in FIG. 11, a state in which an image is displayed on the display panel 10 (a display state 10B), a lighted state of the light source 24 (a lighted state ON), the diffusion state 22D of the diffusion modulation device 22, and the reflection state 23R of the reflection modulation device 23 may be synchronized. Further, a state in which incident light is allowed to pass directly while an image is not displayed on the display panel 10 (a non-display state 10W), an extinguished state of the light source 24 (an extinguished state OFF), the transmission state 22T of the diffusion modulation device 22, and the transmission state 23T of the reflection modulation device 23 may be synchronized. At this moment, assuming that the time in which the display state 10B is established is a period $T_B$, and the time in which the non-display state 10W is established is a period $T_W$, an image is displayed by the light L1 from the light source 24 during the period $T_B$, and the back face side of the backlight 20 is in a state of being visible and transparent from the image display surface 1A side during the period $T_W$. By repeating the period $T_B$ and the period $T_W$, and gradually increasing the length of the period $T_B$, an image gradually appears from a state in which the back face (a background) is completely seen through the display panel 10, namely, from a transparent state. In this way, in the display 1, it is possible to provide a new display method such as fade-in display, without degrading display quality.

Figure 12:
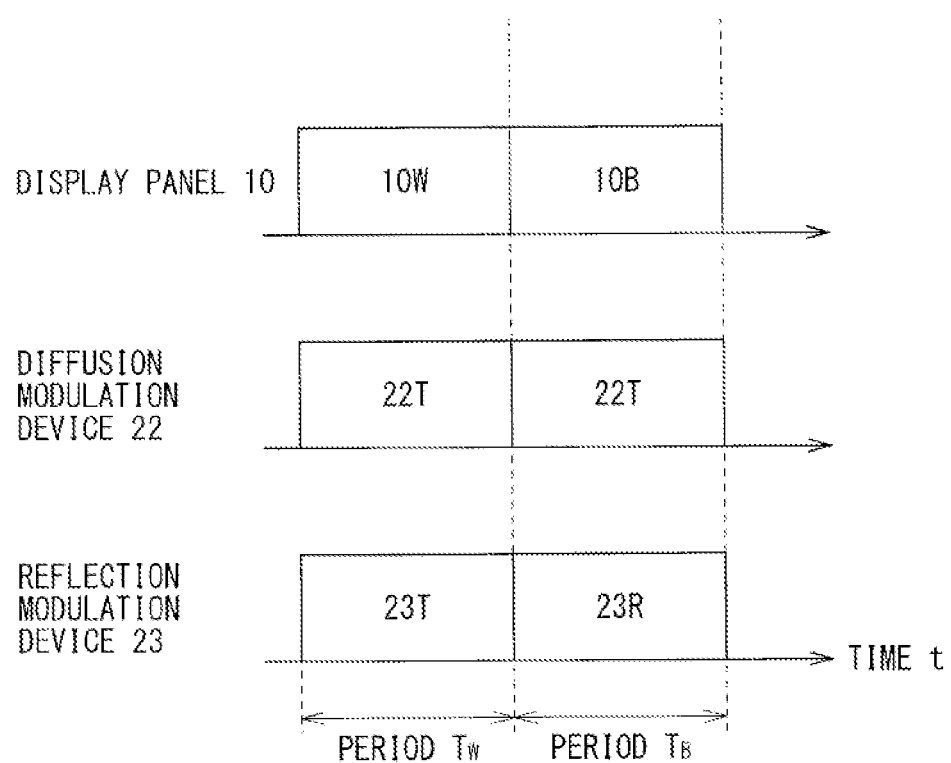
FIG. 12 is a diagram used to describe another example of the driving method of the display illustrated in FIG. 1.

In addition, in the display 1, it is also possible to perform fade-in display as a reflection display utilizing the outside light. As illustrated in FIG. 12, the display state 10B of the display panel 10, the transmission state 22T of the diffusion modulation device 22, and the reflection state 23R of the reflection modulation device 23 (the period $T_B$) are synchronized. Further, the non-display state 10W of the display panel 10, the transmission state 22T of the diffusion modulation device 22, and the transmission state 23T of the reflection modulation device 23 (the period $T_W$) are synchronized. The outside light incident from the image display surface 1A is reflected by the reflection modulation device 23 to display an image during the period $T_B$, and the back face side of the backlight 20 is in a state of being transparent from the image display surface 1A side during the period $T_W$. By repeating the period $T_B$ and the period $T_W$, and gradually increasing the length of the period $T_B$, it is possible to perform the fade-in display.

Moreover, in this display 1, it is also possible to perform image display while keeping the display panel 10 in the non-display state 10W, by using the matrix-driven diffusion modulation device 22. An image is displayed on the diffusion modulation device 22, by performing driving of switching between the diffusion state 22D and the transmission state 22T of the diffusion modulation device 22 for each matrix, in a state in which the reflection modulation device 23 is maintained in the reflection state 23R. In addition, it is possible to perform fade-in display in a manner similar to that described above, by repeating the reflection state 23R of the reflection modulation device 23 and the transmission state 22T of the diffusion modulation device 22, and increasing the length of the period in which the reflection state 23R is established, while keeping the display panel 10 in the non-display state 10W as described above.

As described above, in the present embodiment, the reflection modulation device 23 is allowed to perform the modulation to the transmission state 23T and therefore, it is possible to allow the back light L2 to pass to the display panel 10 side. Hence, it is possible to utilize the back light L2 as the irradiation light to the display panel 10. In addition, it is also possible to display an image, utilizing the light L1 from the light source 24 efficiently, by switching the reflection modulation device 23 to the reflection state 23R, and the diffusion modulation device 22 to the diffusion state 22D.

Moreover, it is also possible to provide a new display method, by variously combining the state of the diffusion modulation device 22 and the state of the reflection modulation device 23.

Modifications of the above-described embodiment and other embodiments will be described below. Elements common to the above-described embodiment will be provided with the same reference numerals as those thereof and will not be described.

Modification 1

In the display 1 according to Modification 1 of the above-described embodiment, the light source 24 is configured using a light source 24R emitting red light, a light source 24G emitting green light, and a light source 24B emitting blue light, and field sequential color (FSC) display is allowed to be performed. An achromatic device is used for a display device of the display panel 10. The light source 24 may be configured using a light source emitting light of a color other than red, green, and blue.

The field sequential color display is a method of displaying a color image based on temporal color mixture. Specifically, for example, red light, green light, and blue light are divided in a time axis, and a plane image of light of each color is sequentially displayed with passage of time. Discrimination of each color light is prevented by switching this image at a speed that makes the image unrecognizable by human eyes, and a color image is displayed utilizing an integral effect in a time direction of the eyes.

Figure 13:
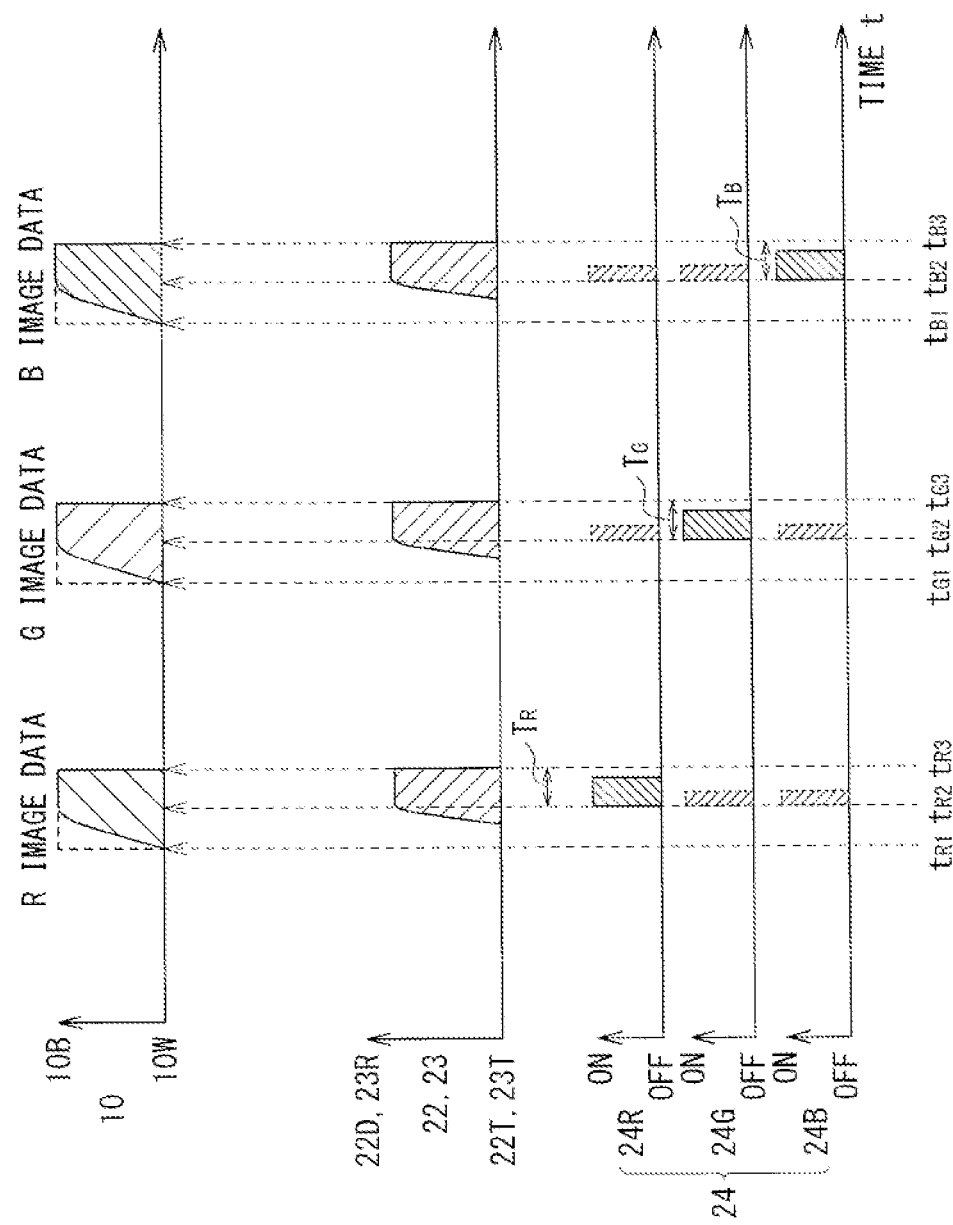
FIG. 13 is a diagram used to describe a driving method of a display according to Modification 1.

As illustrated in FIG. 13, the display 1 according to this Modification 1 performs the field sequential color display, by synchronizing timings of the display state 10B of the display panel 10, the diffusion state 22D of the diffusion modulation device 22, the reflection state 23R of the reflection modulation device 23, and the lighted state ON of each of the light sources 24R, 24G, and 24B. When response times of the display device of the display panel 10, the diffusion modulation device 22, and the reflection modulation device 23 are different from one another, the display panel 10, the diffusion modulation device 22, and the reflection modulation device 23 are driven to achieve agreement between timings of finishing responses. For example, as for the display panel 10, data is written at times $t_{R1}$, $t_{G1}$, and $t_{B1}$, and the display panel 10 enters a response-finished state (the display state 10B) at times $t_{R2}$, $t_{G2}$, and $t_{B2}$. The diffusion modulation device 22 and the reflection modulation device 23 are driven to enter response-finished states (the diffusion state 22D and the reflection state 23R) at the times $t_{R2}$, $t_{G2}$, and $t_{B2}$. The light sources 24R, 24G, and 24B may each emit light alone, or a hue may be adjusted mixing colors by allowing the two light sources to emit light simultaneously in accordance with chromaticity display.

Figure 14:
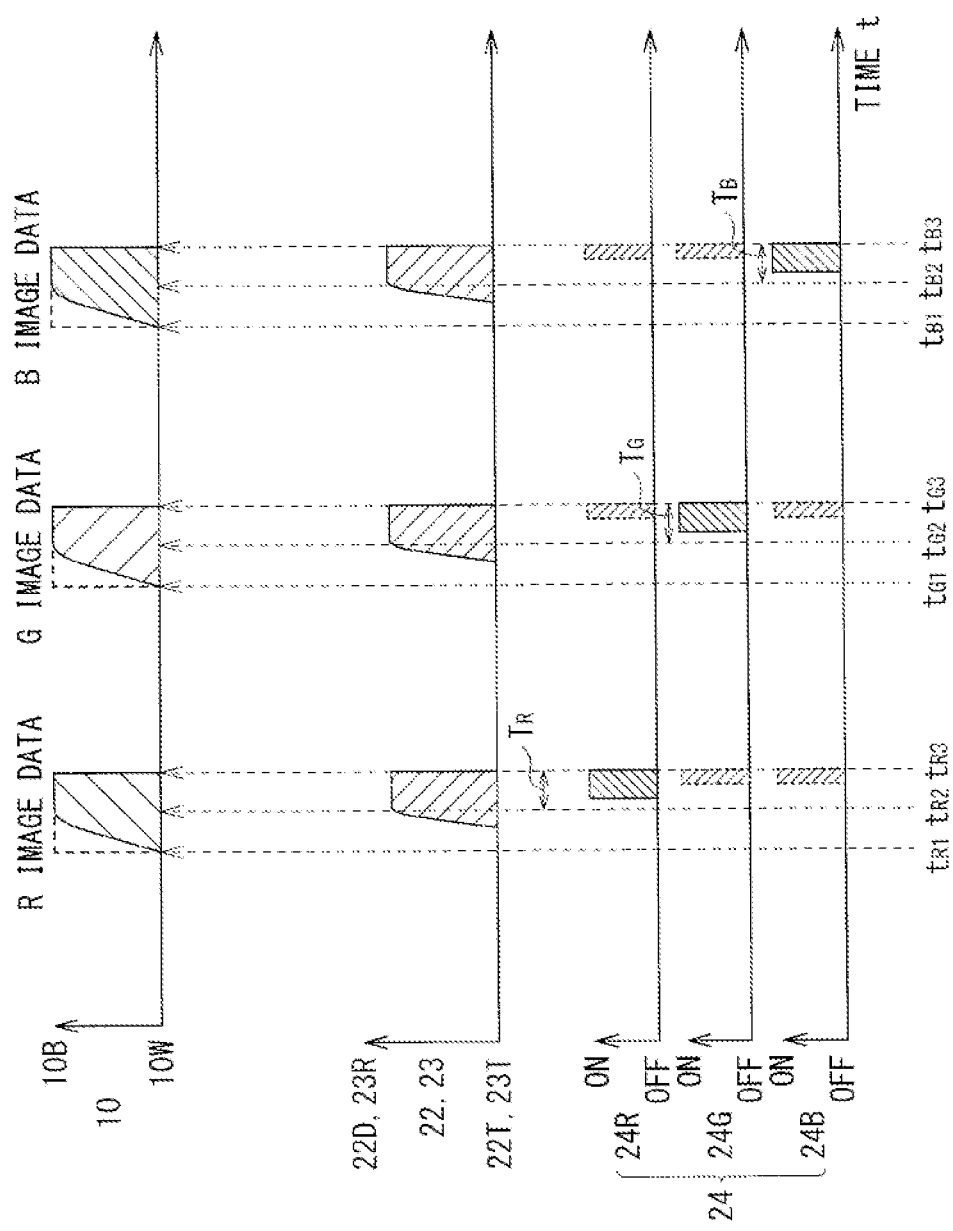
FIG. 14 is a diagram illustrating a modification of the driving method illustrated in FIG. 13.

The light sources 24R, 24G, and 24B may be in the lighted state ON, at least during a part of a period (periods $T_R$, $T_G$, and $T_B$) from the times $t_{R2}$, $t_{G2}$, and $t_{B2}$ at which the display panel 10, the diffusion modulation device 22, and the reflection modulation device 23 enter the response-finished states, to times $t_{R3}$, $t_{G3}$, and $t_{B3}$ at which the non-display state 10W is established. For example, the light sources 24R, 24G, and 24B may enter the lighted state ON at the times $t_{R2}$, $t_{G2}$, and $t_{B2}$ (FIG. 13), or may enter the lighted state ON at times later than the times $t_{R2}$, $t_{G2}$, and $t_{B2}$ as illustrated in FIG. 14.

Modification 2

The display 1 according to Modification 2 of the above-described embodiment has a function of performing chromaticity correction of the outside light, when utilizing the outside light as the back light L2.

Figure 15:
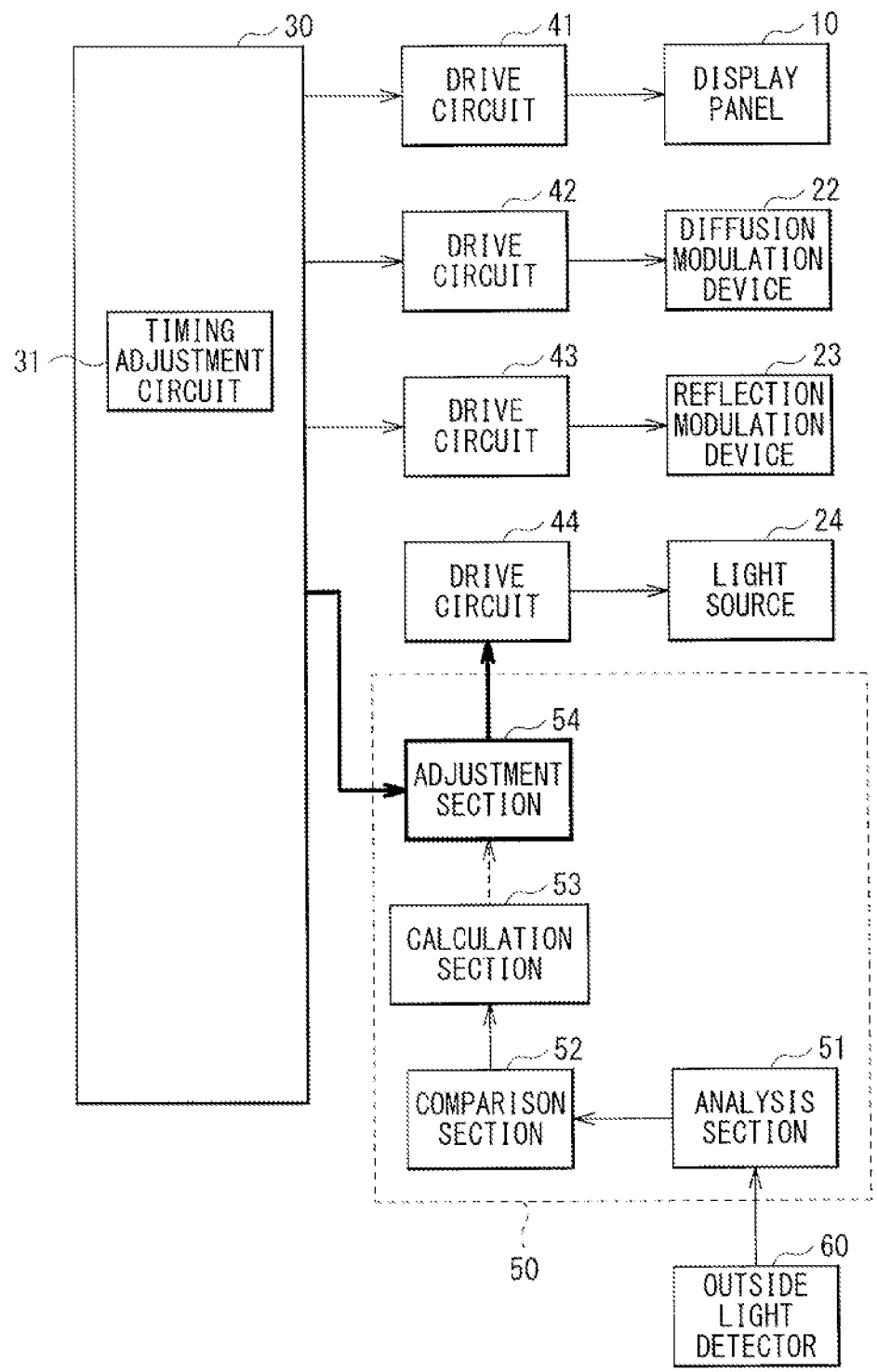
FIG. 15 is a block diagram illustrating a circuit configuration of a display according to Modification 2.

This display 1 is provided with an outside-light correction processing section 50 and an outside light detector 60 as illustrated in FIG. 15. The outside light detector 60 is a sensor that detects light, and may be provided, for example, at a position that allows detection of the outside light, such as a position outside a housing (not illustrated). This outside light detector 60 may be provided on each of a plurality of surfaces except an undersurface of the display 1 (for example, a top surface, side faces, a frame part of the image display surface 1A, and a back face), or may be provided on one surface such as the top surface (an upper surface). For example, the outside light detector 60 may be provided on each of all the surfaces except the undersurface, to detect from which direction the largest quantity of light is incident, and a hue of average ambient light may be determined by subjecting outputs thereof to OR processing. When being provided on only one surface, preferably, for example, the outside light detector 60 may be combined with a convex lens or the like to be able to receive a wider range of light. The outside-light correction processing section 50 includes an analysis section 51, a comparison section 52, a calculation section 53, and an adjustment section 54.

In this display 1, the outside light is detected by the outside light detector 60, and chromaticity as well as luminance thereof are measured in the analysis section 51. These chromaticity and luminance are compared by the comparison section 52 with predetermined chromaticity and luminance of white set beforehand, and a color deficient for appropriate color display and a hue thereof are determined in the calculation section 53. Information of this calculation section 53 is transmitted to the adjustment section 54, and an emitted-light quantity of each color light of the light source 24 is adjusted within a range of allowing compensation. Providing the display 1 with such an outside-light correction function makes it possible to utilize the outside light and to perform high quality display.

Second Embodiment

Figure 16:
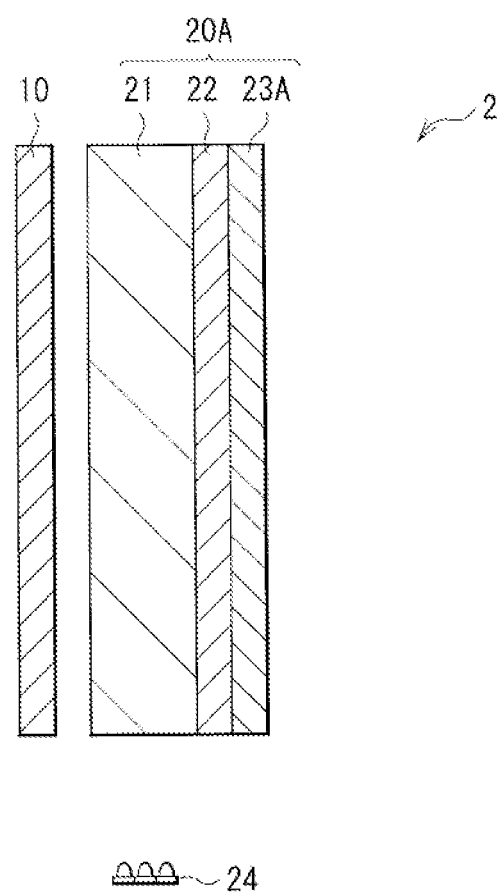
FIG. 16 is a side cross-sectional diagram illustrating a configuration of a display according to a second embodiment of the present disclosure.

FIG. 16 illustrates a side cross-sectional configuration of a display (a display 2) according to a second embodiment of the present technology. A backlight 20A of this display 2 includes a reflection modulation device 23A in place of the reflection modulation device 23 of the above-described first embodiment. This reflection modulation device 23A performs diffuse reflection in the reflection state 23R. Except this point, the display 2 has a configuration similar to that of the display 1, and also has functions and effects similar thereto.

Figure 2:
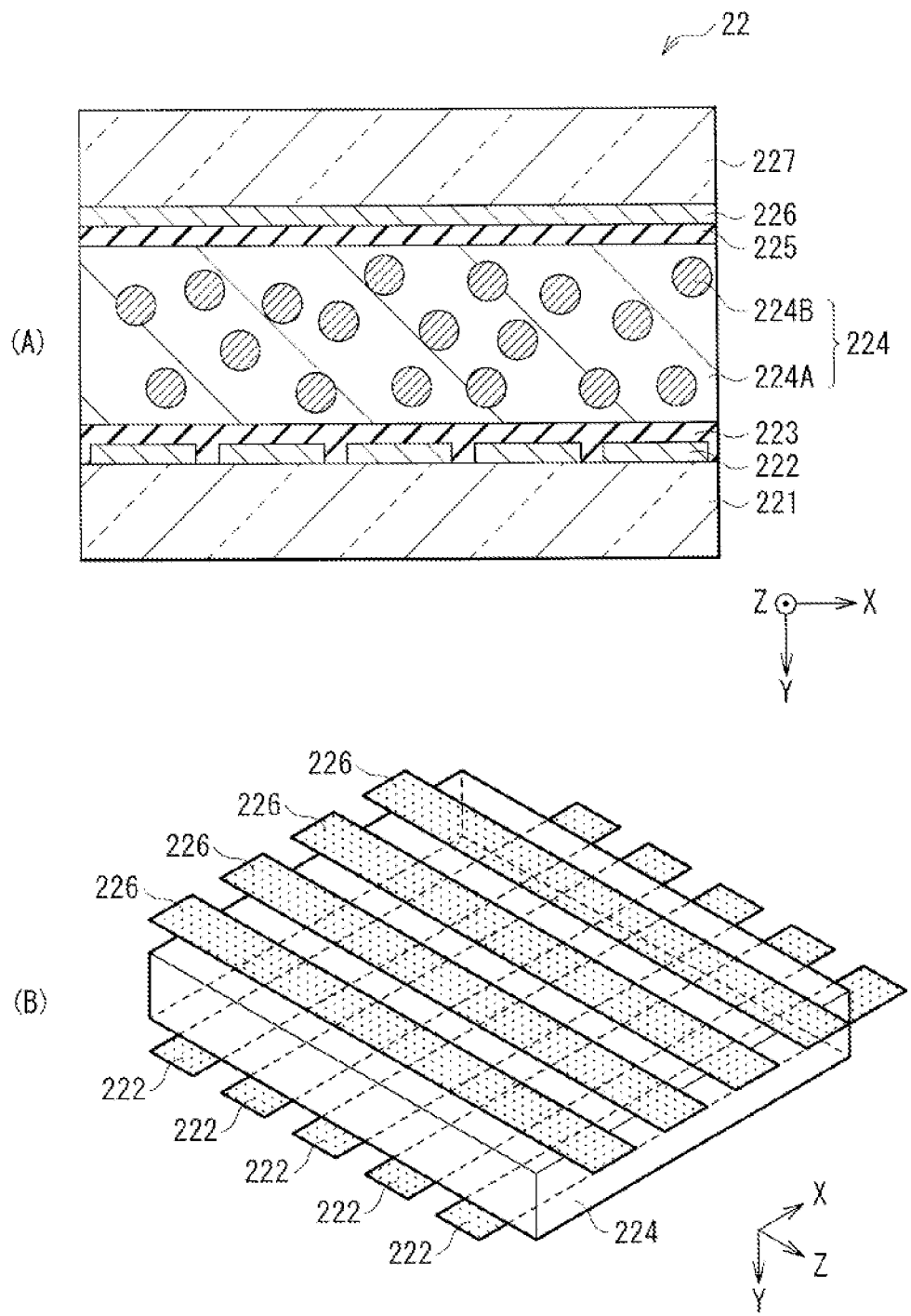
FIG. 2 is a diagram illustrating a configuration of a diffusion modulation device illustrated in FIG. 1.

The reflection modulation device 23A is capable of modulating an action for incident light between the reflection state 23R and the transmission state 23T in a manner similar to that of the reflection modulation device 23, but performs the diffuse reflection of light incident from the front face side (the diffusion modulation device 22 side) in the reflection state 23R. The reflection modulation device 23A may be a device capable of switching between the reflection state 23R and the transmission state 23T, for example, electrically, and is specifically a PDLC or the like. In other words, the reflection modulation device 23A may include, for example, an optical modulation layer in which liquid crystal molecules are dispersed in a polymer, like the diffusion modulation device 22 (FIG. 2).

Figure 17:
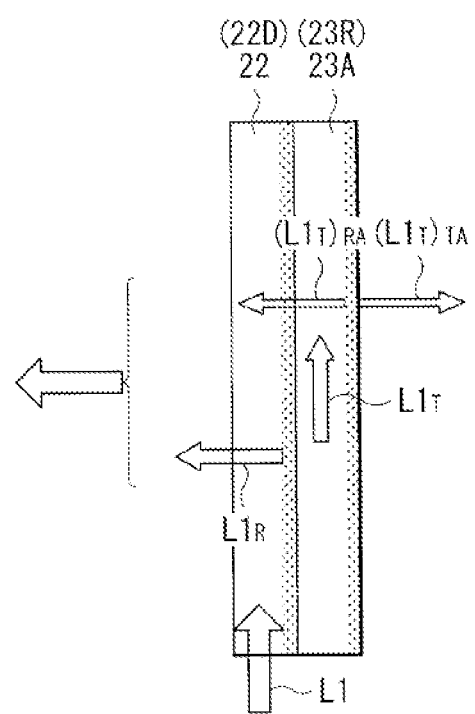
FIG. 17 is a diagram used to describe a path of an outgoing beam from a light source illustrated in FIG. 16.

FIG. 17 schematically illustrates a path of the light L1 from the light source 24, when the diffusion modulation device 22 is in the diffusion state 22D and the reflection modulation device 23A is in the reflection state 23R. The light L1 is diffused by the diffusion modulation device 22, so that the reflected diffused light $L1_R$ is outputted to the front face side and the transmitted diffused light $L1_T$ to the back face side. The reflection modulation device 23A in the reflection state 23R performs the diffuse reflection of this transmitted diffused light $L1_T$, and outputs reflected diffused light $(L1_T)_{RA}$ to the front face side, as well as outputting transmitted diffused light $(L1_T)_{TA}$ to the back face side. In other words, the backlight 20A irradiates the display panel 10 side with the reflected diffused light $L1_R$ as well as the reflected diffused light $(L1_T)_{RA}$ of the light L1, and allows the transmitted diffused light $(L1_T)_{TA}$ of the light L1 to pass therethrough to the back face side. For example, when the diffusion modulation device 22 and the reflection modulation device 23A both return 50% of the incident light to the front face side, and allow the remaining 50% to pass therethrough to the back face side, 75% of the light quantity of the incident light (for example, the light L1) is outputted to the front face side, and 25% is outputted to the back face side. It is possible to increase a light quantity to be outputted to the front face side, by increasing a cloudiness degree of the reflection modulation device 23A in the reflection state 23R to above a cloudiness degree of the diffusion modulation device 22 in the diffusion state 22D. In this way, by adjusting the cloudiness degrees of the diffusion modulation device 22 and the reflection modulation device 23A, it is possible to change a ratio between the light quantity to be outputted to the front face side and that to the back face side.

Third Embodiment

Figure 18:
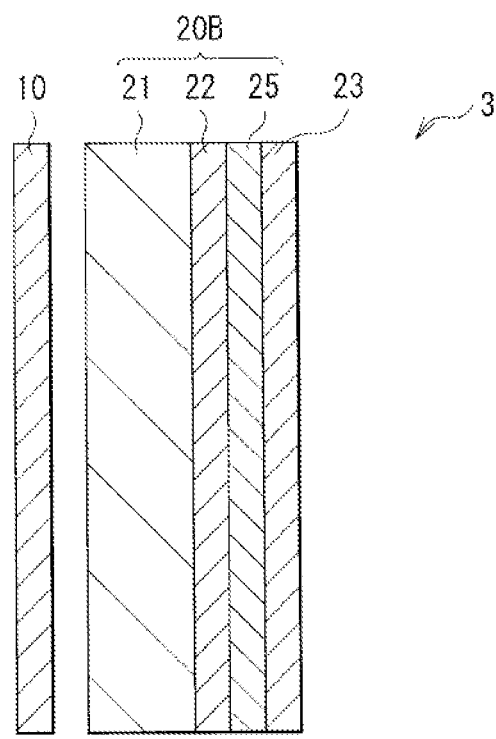
FIG. 18 is a side cross-sectional diagram illustrating a configuration of a display according to a third embodiment of the present disclosure.

FIG. 18 illustrates a side cross-sectional configuration of a display (a display 3) according to a third embodiment of the present technology. A backlight 20B of this display 3 includes an absorption modulation device 25 between the diffusion modulation device 22 and the reflection modulation device 23 of the above-described first embodiment, and this absorption modulation device 25 is capable of modulating absorbance of the incident light. Except this point, the display 3 has a configuration similar to that of the display 1, and also has functions and effects similar thereto.

The absorption modulation device 25 is capable of modulating an action for incident light between an absorbing state 25A (a fifth state) and a transmission state 25T (a sixth state). Specifically, for example, the absorption modulation device 25 may electrically perform the modulation by an electrochromic method. It is possible to set a plurality of states between these states, depending on the magnitude of an applied voltage. In the backlight 20B having this absorption modulation device 25, it is possible to improve a contrast ratio (CR), when using the display 3 mainly as a reflection display.

As illustrated in Part (A) of FIG. 19, when the diffusion modulation device 22 is in the diffusion state 22D, the absorption modulation device 25 is in the transmission state 25T, and the reflection modulation device 23 is in the reflection state 23R, outside light L3 incident from the image display surface 1A side is reflected by the reflection modulation device 23 and outputted to the image display surface 1A side again, after passing through the display panel 10, the diffusion modulation device 22, and the absorption modulation device 25. On the other hand, as illustrated in Part (B) of FIG. 19, when the diffusion modulation device 22 is in the transmission state 22T, the absorption modulation device 25 is in the absorbing state 25A, and the reflection modulation device 23 is in the reflection state 23R, the outside light L3 incident from the image display surface 1A side is absorbed by the absorption modulation device 25, after passing through the display panel 10 and the diffusion modulation device 22. Therefore, the light quantity of the outside light L3 reflected by the reflection modulation device 23 is small as compared with that in Part (A) of FIG. 19. In other words, it is possible to improve the contrast ratio (CR), by switching between the diffusion state 22D of the diffusion modulation device 22 as well as the transmission state 25T of the absorption modulation device 25, and the transmission state 22T of the diffusion modulation device 22 as well as the absorbing state 25A of the absorption modulation device 25, while maintaining the reflection modulation device 23 in the reflection state 23R.

APPLICATION EXAMPLES

Application examples of the display described in each of the above-described embodiments and modifications will be described below. The display of any of the above-described embodiments and the like is applicable to electronic apparatuses in all fields, which display externally-inputted image signals or internally-generated image signals as still or moving images, including television receivers, portable terminals such as laptop personal computers, video cameras, and the like.

Application Example 1

Figure 20:
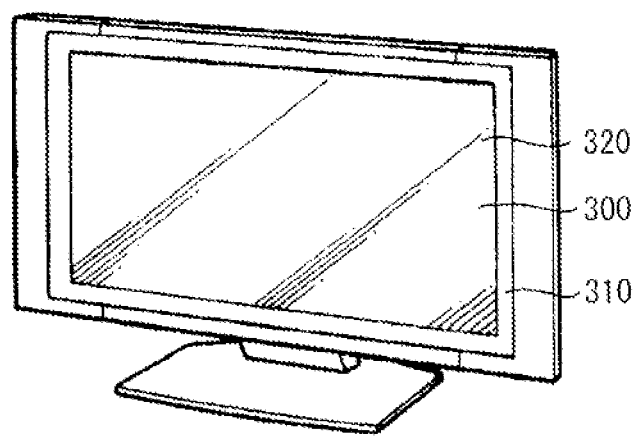
FIG. 20 is a perspective view illustrating an appearance of Application example 1 of the displays of the above-described embodiments.

FIG. 20 illustrates an appearance of a television receiver to which the display of any of the above-described embodiments and the like is applied. This television receiver may have, for example, an image-display screen section 300 that includes a front panel 310 and a filter glass 320. The image-display screen section 300 is configured using the display according to any of the above-described embodiments and the like.

Application Example 2

Figure 21:
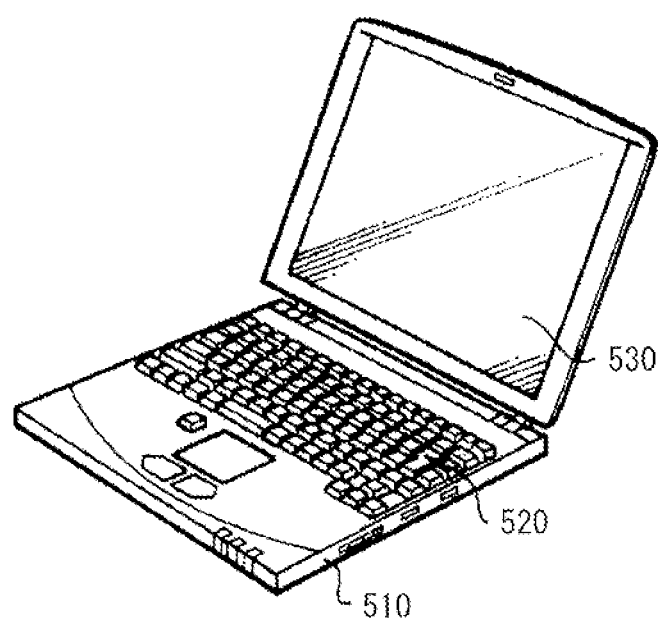
FIG. 21 is a perspective view illustrating an appearance of Application example 2.

FIG. 21 illustrates an appearance of a laptop personal computer to which the display of any of the above-described embodiments and the like is applied. This laptop personal computer may include, for example, a main body section 510, a keyboard 520 provided to enter characters and the like, and a display section 530 displaying an image. The display section 530 is configured using the display according to any of the above-described embodiments and the like.

Application Example 3

Figure 22:
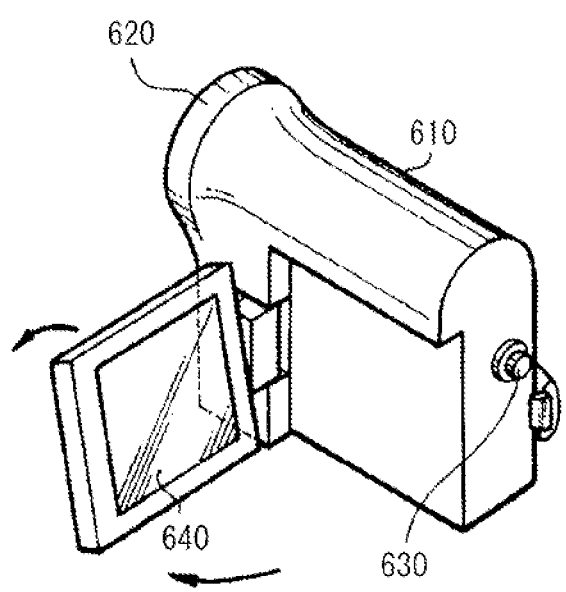
FIG. 22 is a perspective view illustrating an appearance of Application example 3.

FIG. 22 illustrates an appearance of a video camera to which the display of any of the above-described embodiments and the like is applied. This video camera may include, for example, a main body section 610, a lens 620 disposed on a front face of this main body section 610 to shoot an image of a subject, a start/stop switch 630 used in shooting, and a display section 640. The display section 640 is configured using the display according to any of the above-described embodiments and the like.

The present technology has been described above with reference to some embodiments and modifications, but the present technology is not limited to these embodiments and the like and may be variously modified. For example, in the above-described embodiments and the like, the case in which the diffusion modulation device 22 and the reflection modulation device 23A are capable of performing the modulation electrically has been described. However, the diffusion modulation device 22 and the reflection modulation device 23A may be capable of performing modulation in a way other than using electricity. For example, a magnetic means or a mechanical means using a technique such as MEMS (Micro Electro Mechanical System) may be adopted.

In addition, for example, the material and the like of each section described in the above-described embodiments and the like are not limitative. Other materials and thicknesses may be adopted.

Moreover, in the third embodiment, the case in which the absorption modulation device is provided in addition to the diffusion modulation device and the reflection modulation device has been described. However, a modulation device other than the absorption modulation device may be provided.

It is to be noted that the present technology may adopt the following configurations.

(1) A display including:
   a display panel; and
   an illumination unit configured to illuminate the display panel,
   the illumination unit including, in recited order, from the display panel side,
   a light-guiding plate having a light source on a side face thereof,
   a diffusion modulation device being capable of performing modulation between a first state of diffusing light from the light source, and a second state of allowing incident light from a back face side to pass to a front face side, and
   a reflection modulation device being capable of performing modulation between a third state of reflecting transmitted diffused light of the diffusion modulation device to a front face side, and a fourth state of allowing incident light from a back face side to the front face side.

(2) The display according to (1), wherein the reflection modulation device performs the modulation electrically between the third state and the fourth state.

(3) The display according to (1), wherein the diffusion modulation device performs the modulation electrically between the first state and the second state.

(4) The display according to (1), wherein the reflection modulation device performs specular reflection of the transmitted diffused light of the diffusion modulation device in the third state.

(5) The display according to (1), wherein the diffusion modulation device includes an optical modulation layer in which liquid crystal molecules are dispersed in a polymer.

(6) The display according to (5), wherein the reflection modulation device includes an optical modulation layer in which liquid crystal molecules are dispersed in a polymer, and performs diffuse reflection of the transmitted diffused light of the diffusion modulation device in the third state.

(7) The display according to (6), wherein a cloudiness degree of the reflection modulation device in the third state is greater than a cloudiness degree of the diffusion modulation device in the first state.

(8) The display according to (1), wherein an action state of each of the diffusion modulation device and the reflection modulation device is set, to any of a combination of the first state of the diffusion modulation device and the third state of the reflection modulation device, a combination of the first state of the diffusion modulation device and the fourth state of the reflection modulation device, a combination of the second state of the diffusion modulation device and the third state of the reflection modulation device, and a combination of the second state of the diffusion modulation device and the fourth state of the reflection modulation device.

(9) The display according to (1), further including a drive section configured to drive the display panel and the illumination unit based on an image signal, wherein the drive section is configured to synchronize the first state the diffusion modulation device and the third state of the reflection modulation device.

(10) The display according to (9), wherein the drive section is configured to allow an image to appear on the display panel, by synchronizing the second state of the diffusion modulation device and the fourth state of the reflection modulation device, and gradually increasing a period of the first state of the diffusion modulation device and the third state of the reflection modulation device, while alternately repeating the first state of the diffusion modulation device as well as the third state of the reflection modulation device, and the second state of the diffusion modulation device as well as the fourth state of the reflection modulation device.

(11) The display according to (1), further including an absorption modulation device between the diffusion modulation device and the reflection modulation device, wherein
the absorption modulation device is configured to perform modulation between a fifth state of absorbing light incident from the display panel side, and a sixth state of allowing the light incident from the display panel side to pass to the reflection modulation device side.

(12) The display according to (1), further including a drive section configured to drive the display panel and the illumination unit based on an image signal, wherein
the drive section is configured to synchronize the second state of the diffusion modulation device and the third state of the reflection modulation device.

(13) The display according to (12), wherein the drive section is configured to allow an image to appear on the display panel, by synchronizing the second state of the diffusion modulation device and the fourth state of the reflection modulation device, and gradually increasing a period of the second state of the diffusion modulation device and the third state of the reflection modulation device, while alternately repeating the second state of the diffusion modulation device as well as the third state of the reflection modulation device, and the second state of the diffusion modulation device as well as the fourth state of the reflection modulation device.

(14) The display according to (1), further including a drive section configured to drive the display panel and the illumination unit based on an image signal, wherein
the diffusion modulation device is configured to be matrix-driven, and
the drive section is configured to cause the diffusion modulation device to display an image, by performing driving of switching between the first state and the second state of the diffusion modulation device for each matrix, while maintaining the reflection modulation device in the third state.

(15) The display according to (1), further including a drive section configured to drive the display panel and the illumination unit based on an image signal, wherein
the diffusion modulation device is configured to be matrix-driven, and
the drive section is configured to allow an image to appear on the diffusion modulation device, by gradually increasing a period of the third state while repeating the third state and the fourth state of the reflection modulation device, and also by causing the diffusion modulation device to display the image, by performing driving of switching between the first state and the second state of the diffusion modulation device for each matrix.

(16) The display according to (1), further including:
an outside-light detecting section; and
an outside-light correction processing section configured to correct an outgoing beam of the light source, by analyzing incident light on the outside-light detecting section.

(17) The display according to (1), wherein outside light is incident from the back face of the reflection modulation device.

(18) The display according to (1), further including a light-guiding body provided on the back face side of the reflection modulation device.

(19) An illumination unit including, in recited order:
a light-guiding plate; having a light source on a side face thereof,
a diffusion modulation device; being capable of performing modulation between a first state of diffusing light from the light source, and a second state of allowing incident light from a back face side to pass to a front face side, and
a reflection modulation device; being capable of performing modulation between a third state of reflecting transmitted diffused light of the diffusion modulation device to a front face side, and a fourth state of allowing incident light from a back face side to the front face side, wherein
light is outputted from the light-guiding plate side.

(20) An electronic apparatus including
a display, the display including
a display panel, and
an illumination unit configured to illuminate the display panel,
the illumination unit including, in recited order, from the display panel side,
a light-guiding plate having a light source on a side face thereof,
a diffusion modulation device being capable of performing modulation between a first state of diffusing light from the light source, and a second state of allowing incident light from a back face side to pass to a front face side, and
a reflection modulation device being capable of performing modulation between a third state of reflecting transmitted diffused light of the diffusion modulation device to a front face side, and a fourth state of allowing incident light from a back face side to the front face side.

The present application is based on and claims priority from Japanese Patent Application No. 2011-220682 filed in the Japan Patent Office on Oct. 5, 2011, the entire contents of which is hereby incorporated by reference.

The invention claimed is:

1. A display comprising:
   a display panel; and
   an illumination unit configured to illuminate the display panel,
   the illumination unit including, in recited order, from a back side of the display panel,
   a light-guiding plate having a light source on a side face thereof,
   a diffusion modulation device being capable of performing modulation between a first state of diffusing light from the light source, and a second state of allowing incident light from a back face side to pass to a front face side, and
   a reflection modulation device being capable of performing modulation between a third state of reflecting transmitted diffused light of the diffusion modulation device to a front face side, and a fourth state of allowing incident light from a back face side to the front face side,
   each of the light-guiding plate, the diffusion modulation device, and the reflection modulation device being separate from each other, and
   said reflection modulation device being directly adhered to the back face side of the diffusion modulation device without an air gap therebetween.

2. The display according to claim 1, wherein the reflection modulation device performs the modulation electrically between the third state and the fourth state.

3. The display according to claim 1, wherein the diffusion modulation device performs the modulation electrically between the first state and the second state.

4. The display according to claim 1, wherein the reflection modulation device performs specular reflection of the transmitted diffused light of the diffusion modulation device in the third state.

5. The display according to claim 1, wherein the diffusion modulation device includes an optical modulation layer in which liquid crystal molecules are dispersed in a polymer.

6. A display comprising:
   a display panel; and
   an illumination unit configured to illuminate the display panel,
   the illumination unit including, in recited order, from a back side of the display panel,
   a light-guiding plate having a light source on a side face thereof,
   a diffusion modulation device being capable of performing modulation between a first state of diffusing light from the light source, and a second state of allowing incident light from a back face side to pass to a front face side, and
   a reflection modulation device being capable of performing modulation between a third state of reflecting transmitted diffused light of the diffusion modulation device to a front face side, and a fourth state of allowing incident light from a back face side to the front face side,
   wherein the diffusion modulation device includes an optical modulation layer in which liquid crystal molecules are dispersed in a polymer, and
   wherein the reflection modulation device includes an optical modulation layer in which liquid crystal molecules are dispersed in a polymer, and performs diffuse reflection of the transmitted diffused light of the diffusion modulation device in the third state.

7. The display according to claim 6, wherein a cloudiness degree of the reflection modulation device in the third state is greater than a cloudiness degree of the diffusion modulation device in the first state.

8. The display according to claim 1, wherein an action state of each of the diffusion modulation device and the reflection modulation device is set,
   to any of a combination of the first state of the diffusion modulation device and the third state of the reflection modulation device, a combination of the first state of the diffusion modulation device and the fourth state of the reflection modulation device, a combination of the second state of the diffusion modulation device and the third state of the reflection modulation device, and a combination of the second state of the diffusion modulation device and the fourth state of the reflection modulation device.

9. The display according to claim 1, further comprising a drive section configured to drive the display panel and the illumination unit based on an image signal, wherein
   the drive section is configured to synchronize the first state the diffusion modulation device and the third state of the reflection modulation device.

10. A display comprising:
    a display panel;
    an illumination unit configured to illuminate the display panel; and
    a drive section configured to drive the display panel and the illumination unit based on an image signal,
    the illumination unit including, in recited order, from a back side of the display panel,
    a light-guiding plate having a light source on a side face thereof,
    a diffusion modulation device being capable of performing modulation between a first state of diffusing light from the light source, and a second state of allowing incident light from a back face side to pass to a front face side, and
    a reflection modulation device being capable of performing modulation between a third state of reflecting transmitted diffused light of the diffusion modulation device to a front face side, and a fourth state of allowing incident light from a back face side to the front face side,
    wherein the drive section is configured to synchronize the first state of the diffusion modulation device and the third state of the reflection modulation device, and
    wherein the drive section is configured to allow an image to appear on the display panel, by synchronizing the second state of the diffusion modulation device and the fourth state of the reflection modulation device, and gradually increasing a period of the first state of the diffusion modulation device and the third state of the reflection modulation device, while alternately repeating the first state of the diffusion modulation device as well as the third state of the reflection modulation device, and the second state of the diffusion modulation device as well as the fourth state of the reflection modulation device.

11. A display comprising:
    a display panel; and
    an illumination unit configured to illuminate the display panel,
    the illumination unit including, in recited order, from a back side of the display panel,
    a light-guiding plate having a light source on a side face thereof,
    a diffusion modulation device being capable of performing modulation between a first state of diffusing light from the light source, and a second state of allowing incident light from a back face side to pass to a front face side, an absorption modulation device, and a reflection modulation device being capable of performing modulation between a third state of reflecting transmitted diffused light of the diffusion modulation device to a front face side, and a fourth state of allowing incident light from a back face side to the front face side wherein the absorption modulation device is between the diffusion modulation device and the reflection modulation device, and wherein the absorption modulation device is configured to perform modulation between a fifth state of absorbing light incident from the display panel side, and a sixth state of allowing the light incident from the display panel side to pass to the reflection modulation device side.

12. The display according to claim 1, further comprising a drive section configured to drive the display panel and the illumination unit based on an image signal, wherein the drive section is configured to synchronize the second state of the diffusion modulation device and the third state of the reflection modulation device.

13. A display comprising:

a display panel;

an illumination unit configured to illuminate the display panel; and a drive section configured to drive the display panel and the illumination unit based on an image signal, the illumination unit including, in recited order, from a back side of the display panel, a light-guiding plate having a light source on a side face thereof, a diffusion modulation device being capable of performing modulation between a first state of diffusing light from the light source, and a second state of allowing incident light from a back face side to pass to a front face side, and a reflection modulation device being capable of performing modulation between a third state of reflecting transmitted diffused light of the diffusion modulation device to a front face side, and a fourth state of allowing incident light from a back face side to the front face side, wherein the drive section is configured to synchronize the second state of the diffusion modulation device and the third state of the reflection modulation device, and wherein the drive section is configured to allow an image to appear on the display panel, by synchronizing the second state of the diffusion modulation device and the fourth state of the reflection modulation device, and gradually increasing a period of the second state of the diffusion modulation device and the third state of the reflection modulation device, while alternately repeating the second state of the diffusion modulation device as well as the third state of the reflection modulation device, and the second state of the diffusion modulation device as well as the fourth state of the reflection modulation device.

14. A display comprising:

a display panel;

an illumination unit configured to illuminate the display panel; and a drive section configured to drive the display panel and the illumination unit based on an image signal, the illumination unit including, in recited order, from a back side of the display panel, a light-guiding plate having a light source on a side face thereof, a diffusion modulation device being capable of performing modulation between a first state of diffusing light from the light source, and a second state of allowing incident light from a back face side to pass to a front face side, and a reflection modulation device being capable of performing modulation between a third state of reflecting transmitted diffused light of the diffusion modulation device to a front face side, and a fourth state of allowing incident light from a back face side to the front face side, the diffusion modulation device is configured to be matrix-driven, and the drive section is configured to cause the diffusion modulation device to display an image, by performing driving of switching between the first state and the second state of the diffusion modulation device for each matrix, while maintaining the reflection modulation device in the third state.

15. A display comprising:

a display panel;

an illumination unit configured to illuminate the display panel; and a drive section configured to drive the display panel and the illumination unit based on an image signal, the illumination unit including, in recited order, from a back side of the display panel, a light-guiding plate having a light source on a side face thereof, a diffusion modulation device being capable of performing modulation between a first state of diffusing light from the light source, and a second state of allowing incident light from a back face side to pass to a front face side, and a reflection modulation device being capable of performing modulation between a third state of reflecting transmitted diffused light of the diffusion modulation device to a front face side, and a fourth state of allowing incident light from a back face side to the front face side, the diffusion modulation device is configured to be matrix-driven, and the drive section is configured to allow an image to appear on the diffusion modulation device, by gradually increasing a period of the third state while repeating the third state and the fourth state of the reflection modulation device, and also by causing the diffusion modulation device to display the image, by performing driving of switching between the first state and the second state of the diffusion modulation device for each matrix.

16. A display comprising:

a display panel;

an illumination unit configured to illuminate the display panel;

an outside-light detecting section; and an outside-light correction processing section configured to correct an outgoing beam of the light source, by analyzing incident light on the outside-light detecting section, the illumination unit including, in recited order, from a back side of the display panel, a light-guiding plate having a light source on a side face thereof, a diffusion modulation device being capable of performing modulation between a first state of diffusing light from the light source, and a second state of allowing incident light from a back face side to pass to a front face side, and a reflection modulation device being capable of performing modulation between a third state of reflecting transmitted diffused light of the diffusion modulation device to a front face side, and a fourth state of allowing incident light from a back face side to the front face side.

17. The display according to claim 1, wherein outside light is incident from the back face of the reflection modulation device.

18. The display according to claim 1, further comprising a light-guiding body provided on the back face side of the reflection modulation device.

19. An illumination unit comprising, in recited order:
a light-guiding plate; having a light source on a side face thereof,
a diffusion modulation device; being capable of performing modulation between a first state of diffusing light from the light source, and a second state of allowing incident light from a back face side to pass to a front face side, and
a reflection modulation device; being capable of performing modulation between a third state of reflecting transmitted diffused light of the diffusion modulation device to a front face side, and a fourth state of allowing incident light from a back face side to the front face side,
wherein light is outputted from the light-guiding plate side, each of the light-guiding plate, the diffusion modulation device, and the reflection modulation device being separate from each other, and
said reflection modulation device being directly adhered to the back face side of the diffusion modulation device without an air gap therebetween.

20. An electronic apparatus comprising
a display, the display including
a display panel, and
an illumination unit configured to illuminate the display panel,
the illumination unit including, in recited order, from a back side of the display panel,
a light-guiding plate having a light source on a side face thereof,
a diffusion modulation device being capable of performing modulation between a first state of diffusing light from the light source, and a second state of allowing incident light from a back face side to pass to a front face side, and
a reflection modulation device being capable of performing modulation between a third state of reflecting transmitted diffused light of the diffusion modulation device to a front face side, and a fourth state of allowing incident light from a back face side to the front face side,
each of the light-guiding plate, the diffusion modulation device, and the reflection modulation device being separate from each other, and
said reflection modulation device being directly adhered to the back face side of the diffusion modulation device without an air gap therebetween.

* * * * *